US012284690B2

(12) United States Patent
Zheng et al.

(10) Patent No.: US 12,284,690 B2
(45) Date of Patent: Apr. 22, 2025

(54) RANDOM ACCESS PROCEDURE

(71) Applicant: QUALCOMM Incorporated, San Diego, CA (US)

(72) Inventors: Ruiming Zheng, Beijing (CN); Linhai He, San Diego, CA (US); Chao Wei, Beijing (CN); Jing Lei, San Diego, CA (US); Xiaoxia Zhang, San Diego, CA (US); Ozcan Ozturk, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 17/593,522

(22) PCT Filed: Apr. 8, 2020

(86) PCT No.: PCT/CN2020/083627
§ 371 (c)(1),
(2) Date: Sep. 20, 2021

(87) PCT Pub. No.: WO2020/207392
PCT Pub. Date: Oct. 15, 2020

(65) Prior Publication Data
US 2022/0167401 A1 May 26, 2022

(30) Foreign Application Priority Data

Apr. 11, 2019 (WO) ............... PCT/CN2019/082238
Apr. 30, 2019 (WO) ............... PCT/CN2019/085126

(51) Int. Cl.
*H04W 74/0833* (2024.01)
*H04L 1/00* (2006.01)
(Continued)

(52) U.S. Cl.
CPC ......... *H04W 74/085* (2013.01); *H04L 1/0025* (2013.01); *H04W 74/002* (2013.01);
(Continued)

(58) Field of Classification Search
None
See application file for complete search history.

(56) References Cited

U.S. PATENT DOCUMENTS

2010/0034162 A1* 2/2010 Ou ..................... H04W 74/0866
455/450
2010/0278064 A1* 11/2010 Jeong .................. H04W 74/008
370/252

(Continued)

FOREIGN PATENT DOCUMENTS

CN 108271275 A 7/2018
CN 108282897 A 7/2018
(Continued)

OTHER PUBLICATIONS

LG Electronics Inc: "Contention-Based 2-Step RACH Procedure", 3GPP TSG-RAN WG2 Meeting #105bis, R2-1903729, Contention-Based 2-Step Rach Procedure, 3rd Generation Partnership Project, Mobile Competence Centre, 650, Route Des Lucioles, F-06921 Sophia-Antipolis Cedex, France, vol. RAN WG2, No. Xi'an, China, Apr. 8, 2019-Apr. 12, 2019, Apr. 6, 2019, XP051701070, pp. 1-5, paragraph [0001]-paragraph [02.3], figures 1,2.

(Continued)

Primary Examiner — San Htun
(74) Attorney, Agent, or Firm — Harrity & Harrity, LLP

(57) ABSTRACT

Some techniques and apparatuses described herein provide an indication of a result of decoding a two-step random access channel (RACH) message and an action to be performed by a user equipment (UE). For example, some techniques and apparatuses described herein may provide (Continued)

the indication using a UE contention resolution identity-based approach, wherein the contention resolution identity of the UE may be provided in a random access response. Some techniques and apparatuses described herein may use a fallback indicator that indicates the result of decoding and/or the action to be performed. Some techniques and apparatuses described herein may use a random access response (RAR) subheader that selectively omits a random access preamble identifier based at least in part on the result of decoding and/or the action to be performed.

30 Claims, 21 Drawing Sheets

(51) Int. Cl.
- *H04W 74/00* (2009.01)
- *H04W 74/04* (2009.01)
- *H04W 74/08* (2024.01)
- *H04W 80/02* (2009.01)

(52) U.S. Cl.
CPC .......... *H04W 74/04* (2013.01); *H04W 74/08* (2013.01); *H04W 80/02* (2013.01)

(56) References Cited

U.S. PATENT DOCUMENTS

| | | | |
|---|---|---|---|
| 2011/0039541 A1* | 2/2011 | Park | H04W 48/08 455/422.1 |
| 2011/0205908 A1* | 8/2011 | Yi | H04W 74/002 370/242 |
| 2012/0300714 A1* | 11/2012 | Ng | H04W 56/0045 370/329 |
| 2013/0083739 A1 | 4/2013 | Yamada | |
| 2015/0230204 A1* | 8/2015 | Lin | H04W 74/0833 370/312 |
| 2015/0289292 A1 | 10/2015 | Sun et al. | |
| 2018/0205516 A1 | 7/2018 | Jung et al. | |
| 2018/0270869 A1* | 9/2018 | Tsai | H04W 74/006 |
| 2018/0279375 A1* | 9/2018 | Jeon | H04W 72/23 |
| 2019/0335515 A1* | 10/2019 | Chen | H04W 74/0858 |
| 2019/0349837 A1* | 11/2019 | Shih | H04W 76/25 |
| 2019/0357266 A1 | 11/2019 | Ren et al. | |
| 2020/0100297 A1* | 3/2020 | Agiwal | H04B 17/327 |
| 2020/0146069 A1* | 5/2020 | Chen | H04W 76/11 |
| 2020/0260498 A1* | 8/2020 | Xu | H04W 74/0833 |
| 2020/0404711 A1 | 12/2020 | Zhao et al. | |

FOREIGN PATENT DOCUMENTS

| | | |
|---|---|---|
| CN | 108282901 A | 7/2018 |
| WO | 2018127226 A1 | 7/2018 |

OTHER PUBLICATIONS

LG Electronics Inc: "RNTI for msgB in 2-step RACH", R2-1903732, 3GPP TSG-RAN WG2 Meeting #105bis, RNTI for MSGB in 2-STEP RACH, 3rd Generation Partnership Project, Mobile Competence Centre, 650, Route Des Lucioles, F-06921 Sophia-Antipolis Cedex, France, vol. RAN WG2, No. Xi'an, China, Apr. 8, 2019-Apr. 12, 2019, Apr. 6, 2019, XP051701073, pp. 1-3, paragraph [0002], Best Available Date: Apr. 8-12, 2019.
Supplementary European Search Report—EP20788422—Search Authority—The Hague—Dec. 7, 2022.
Caict: "A Scheme of Fallback from 2-step RACH to 4-step RACH", 3GPP TSG RAN WG1 Meeting #96, R1-1902918, Athens, Greece, Feb. 25-Mar. 1, 2019, Mar. 1, 2019 (Mar. 1, 2019), 5 Pages, the Section 2.1.
International Search Report and Written Opinion—PCT/CN2019/085126—ISA/EPO—Jan. 14, 2020.
International Search Report and Written Opinion—PCT/CN2020/083627—ISAEPO—Jul. 8, 2020.
International Search Report and Written Opinion—PCT/CN2019/082238—ISA/EPO—Jan. 9, 2020.
Zte: "Summary of 7.2.1.2 Procedure for Two-step RACH", 3GPP TSG RAN WG1 #96, R1-1903436, Athens, Greece, Feb. 25-Mar. 1, 2019, Mar. 3, 2019 (Mar. 3, 2019), Retrieved from the Internet: URL: http://www.3gpp.org/ftp/tsg%5Fran/WG1%5FRL1/TSGR1%5F96/Docs/R1%2D1903436%2Ezip, [retrieved on Mar. 3, 2019], 12 pages, sections 1-3, the Section 2.3.
Zte Corporation., et al., "General Consideration on the Content of MsgB", 3GPP TSG-WG2 Meeting #105-bis, R2-1903548, China, Xian, Apr. 8-12, 2019, 9 Pages.
Huawei, et al., "Discussion on msgB for 2-step RACH", 3GPP TSG-RAN WG2 Meeting #105bis, R2-1904113, Xi'an, China, Apr. 8-12, 2019, 4 pages.
Samsung: "2 Step RA: MAC PDU Format for MsgB": 3GPP TSG-RAN2 105bis, R2-1903115, Xian, China, Apr. 8-Apr. 12, 2019, 3 pages.
CAICT: "A Scheme of Fallback from 2-Step RACH to 4-Step RACH", 3GPP TSG RAN WG1 Meeting #96, R1-1902918, Athens, Greece, Feb. 25-Mar. 1, 2019, 5 Pages.
LG Electronics Inc: "RNTI for msgB in 2-step RACH", 3GPP TSG-RAN WG2 Meeting #105bis, R2-1903732, Xi'an, China, Apr. 8-12, 2019, pp. 1-3.
Motorola Mobility, et al., "2-Step RACH Procedure", 3GPP Draft, 3GPP TSG RAN WG1 #96bis, R1-1904928, 2- Step Rach Procedure, 3rd Generation Partnership Project (3GPP), Mobile Competence Centre, 650, Route Des Lucioles, F-06921 Sophia-Antipolis Cedex, France, vol. Ran WG1, No. Xian, China, Apr. 3-12, 2019, Mar. 30, 2019 (Mar. 30, 2019), XP051691868, 3 Pages, The Whole Document. Best Available Date: Apr. 3-12, 2019 /S.H./.
Nokia., et al., "2-Step RACH Procedure Feature Lead Summary", R1-1905670, FF3GPP TSG RAN WG1 #96bis, Xi'an, China, Apr. 8-12, 2019, pp. 1-92.
Vivo: "Discussion on 2-step RACH Procedure", 3GPP TSG RAN WG1 #96bis, R1-1904060, Xi'an, China, Apr. 8-12, 2019, 6 Pages.
ZTE, et al., "On 2-Step RACH Procedures," 3GPP TSG RAN WG1 Meeting #96bis, R1-1903879, Xi'an, China, Apr. 8-12, 2019, (Dec. 4, 2019), R1-1903879, 10 pages, the whole document.
LG Electronics Inc: "Contention-Based 2-Step RACH Procedure", 3GPP TSG-RAN WG2 Meeting #105bis, R2-1903729, 3rd Generation Partnership Project (3GPP), Mobile Competence Centre, 650, Route Des Lucioles, F-06921, Sophia-Antipolis Cedex, France, Xi'an, China, Apr. 8-12, 2019, XP051701070, pp. 1-5, Apr. 6, 2019.
ZTE: "Summary of 7.2.1.2 Procedure for Two-step RACH", 3GPP TSG RAN WG1 #96, R1-1903436, Athens, Greece, Feb. 25-Mar. 1, 2019, XP051690820, Mar. 1, 2019, 12 Pages.

* cited by examiner

RANDOM ACCESS PROCEDURE

CROSS-REFERENCE TO RELATED APPLICATIONS

This application is a 371 national stage of PCT Application No. PCT/CN2020/083627, filed on Apr. 8, 2020, entitled "RANDOM ACCESS PROCEDURE," which claims priority to PCT Application No. PCT/CN2019/085126, filed on Apr. 30, 2019, entitled "TWO-STEP RACH MESSAGE B CONTENT," and to PCT Application No. PCT/CN2019/082238, filed on Apr. 11, 2019, entitled "INDICATION FOR TWO-STEP RACH FALLBACK TO FOUR-STEP RACH," all of which are hereby expressly incorporated by reference herein.

BACKGROUND

Field

Aspects of the present disclosure generally relate to wireless communication, and to techniques and apparatuses for indication for two-step random access channel (RACH) fallback to four-step RACH.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

A UE may perform a random access procedure (e.g., a random access channel (RACH) procedure, a physical RACH (PRACH) procedure, and/or the like) to access a network via a BS. In some cases, the UE may perform a four-step RACH procedure, which involves a first uplink random access message to provide a preamble of the UE (e.g., Message 1 or Msg1), a second downlink random access response to the first uplink random access message (e.g., Message 2 or Msg2), a third uplink random access message with a payload (e.g., Message 3 or Msg3), and a fourth downlink random access message (e.g., Message 4 or Msg4). In some cases, the UE may perform a two-step RACH procedure, wherein Message 1 and Message 3 are combined into a single uplink message (e.g., Message A or MsgA) and Message 2 and Message 4 are combined into a single downlink message (e.g., Message B or MsgB). In some cases, a BS may successfully receive a preamble of a RACH message, and may fail to receive a payload of the RACH message (e.g., Message A). In such a case, the UE may fall back to a four-step RACH approach, or may reattempt the random access. In other cases, a BS may successfully receive the payload and the preamble. In such a case, the RACH procedure may continue uninterrupted. It may be useful to provide a messaging system whereby the BS can signal a result of decoding the RACH message (e.g., preamble and payload successfully received, preamble successfully received and payload unsuccessfully received, preamble and payload unsuccessfully received, and/or the like) and an action to be performed by the UE (e.g., fallback to a four-step RACH procedure, reattempt a two-step RACH procedure or a four-step RACH procedure, retransmit a payload of the RACH message, and/or the like).

Some techniques and apparatuses described herein provide an indication of a result of decoding a two-step RACH message and an action to be performed by the UE. For example, some techniques and apparatuses described herein may provide the indication using a UE contention resolution identity-based approach, wherein the contention resolution identity of the UE may be provided in a random access response. Some techniques and apparatuses described herein may use a fallback indicator that indicates the result of decoding and/or the action to be performed. Some techniques and apparatuses described herein may use a random access response (RAR) subheader that selectively omits a random access preamble identifier based at least in part on the result of decoding and/or the action to be performed. In this way, the BS may signal, to the UE, a result of decoding and/or an action to be performed. The UE may perform the action (e.g., falling back to the four-step RACH procedure, reattempting RACH, and/or the like) in accordance with the indication. Thus, the granularity of actions to be signaled in connection with a two-step RACH procedure may be improved, thereby improving network performance and increasing reliability of the two-step RACH procedure. Furthermore, the techniques and apparatuses described herein provide messaging structures for the indication of RACH outcomes for multiple UEs, for example, using contention resolution information or other information associated with the multiple UEs in a medium access control (MAC) message to the multiple UEs. For example, if a first UE receives a MAC message with contention resolution information for a second UE, then the first UE may perform an action based at least in part on the information in the MAC message. If the second UE receives the MAC message with the contention resolution information for the second UE, then the second UE may determine that the second UE's RACH message was successfully received. These MAC messages can be used to provide indications of decoding results and/or actions for multiple UEs (e.g., four UEs, eight UEs, and so on). The consolidation of such feedback for multiple UEs, in association with the indication of the action to be performed, may improve utilization of network resources and reduce usage of UE computing resources relative to a UE-by-UE indication of whether the RACH procedure is successful.

In this way, the amount of monitoring of scheduling information to be performed by a UE is reduced, thereby conserving computing resources and power of the UE. Furthermore, by providing the contention resolution information in the random access response, communication and computing resource usage of the UE is reduced relative to providing the contention resolution information separately from the random access response. Still further, by providing the contention resolution information in the random access response, decoding complexity and the probability of decoding error for the indication are reduced relative to providing the contention resolution information separately from the random access response.

In an aspect of the disclosure, a method, a user equipment (UE), a base station, an apparatus, and a computer program product are provided.

In some aspects, a method of wireless communication, performed by a UE, may include attempting a random access by transmitting a random access message associated with a two-step random access procedure; receiving an indication that indicates that a preamble of the random access message and a payload of the random access message were successfully received, or that the payload was not successfully received; and selectively: completing the two-step random access procedure based at least in part on determining that the indication indicates that the preamble of the random access message and the payload of the random access message were successfully received, or reattempting the random access or performing a fallback to a four-step random access procedure based at least in part on determining that the indication indicates that the payload was not successfully received.

In some aspects, the UE may include a memory and one or more processors operatively coupled to the memory. The memory and the one or more processors may be configured to attempt a random access by transmit a random access message associated with a two-step random access procedure; receive an indication that indicates that a preamble of the random access message and a payload of the random access message were successfully received, or that the payload was not successfully received; and selectively: complete the two-step random access procedure based at least in part on determining that the indication indicates that the preamble of the random access message and the payload of the random access message were successfully received, or reattempt the random access or perform a fallback to a four-step random access procedure based at least in part on determining that the indication indicates that the payload was not successfully received.

In some aspects, the apparatus may include means for attempting a random access by transmitting a random access message associated with a two-step random access procedure; means for receiving an indication that indicates that a preamble of the random access message and a payload of the random access message were successfully received, or that the payload was not successfully received; and means for selectively: completing the two-step random access procedure based at least in part on determining that the indication indicates that the preamble of the random access message and the payload of the random access message were successfully received, or reattempting the random access or performing a fallback to a four-step random access procedure based at least in part on determining that the indication indicates that the payload was not successfully received.

In some aspects, the computer program product may include a non-transitory computer-readable medium storing one or more instructions. The one or more instructions, when executed by one or more processors of a UE, may cause the one or more processors to attempt a random access by transmit a random access message associated with a two-step random access procedure; receive an indication that indicates that a preamble of the random access message and a payload of the random access message were successfully received, or that the payload was not successfully received; and selectively: complete the two-step random access procedure based at least in part on determining that the indication indicates that the preamble of the random access message and the payload of the random access message were successfully received, or reattempt the random access or perform a fallback to a four-step random access procedure based at least in part on determining that the indication indicates that the payload was not successfully received.

In some aspects, a method of wireless communication, performed by a base station, may include receiving, from a UE attempting random access, a random access message associated with a two-step random access procedure; transmitting an indication that indicates that a preamble of the random access message and a payload of the random access message were successfully received, or that the payload was not successfully received; and selectively: completing the two-step random access procedure based at least in part on determining that the indication indicates that the preamble of the random access message and the payload of the random access message were successfully received, or receiving messaging associated with the UE reattempting the random access or performing a fallback to a four-step random access procedure based at least in part on determining that the indication indicates that the payload was not successfully received.

In some aspects, the base station may include a memory and one or more processors operatively coupled to the memory. The memory and the one or more processors may be configured to receive, from a UE attempting random access, a random access message associated with a two-step random access procedure; transmit an indication that indicates that a preamble of the random access message and a payload of the random access message were successfully received, or that the payload was not successfully received; and selectively: complete the two-step random access procedure based at least in part on determining that the indication indicates that the preamble of the random access message and the payload of the random access message were successfully received, or receive messaging associated with the UE reattempting the random access or performing a fallback to a four-step random access procedure based at least in part on determining that the indication indicates that the payload was not successfully received.

In some aspects, the apparatus may include means for receiving, from a UE attempting random access, a random access message associated with a two-step random access procedure; means for transmitting an indication that indicates that a preamble of the random access message and a payload of the random access message were successfully received, or that the payload was not successfully received; and means for selectively: completing the two-step random access procedure based at least in part on determining that the indication indicates that the preamble of the random access message and the payload of the random access message were successfully received, or receiving messaging associated with the UE reattempting the random access or performing a fallback to a four-step random access procedure based at least in part on determining that the indication indicates that the payload was not successfully received.

In some aspects, the computer program product may include a non-transitory computer-readable medium storing one or more instructions. The one or more instructions, when executed by one or more processors of a base station, may cause the one or more processors to receive, from a UE attempting random access, a random access message associated with a two-step random access procedure; transmit an indication that indicates that a preamble of the random access message and a payload of the random access message were successfully received, or that the payload was not successfully received; and selectively: complete the two-step random access procedure based at least in part on determining that the indication indicates that the preamble of the random access message and the payload of the random access message were successfully received, or receive messaging associated with the UE reattempting the random access or performing a fallback to a four-step random access procedure based at least in part on determining that the indication indicates that the payload was not successfully received.

Aspects generally include a method, apparatus, system, computer program product, non-transitory computer-readable medium, user equipment, base station, wireless communication device, and processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
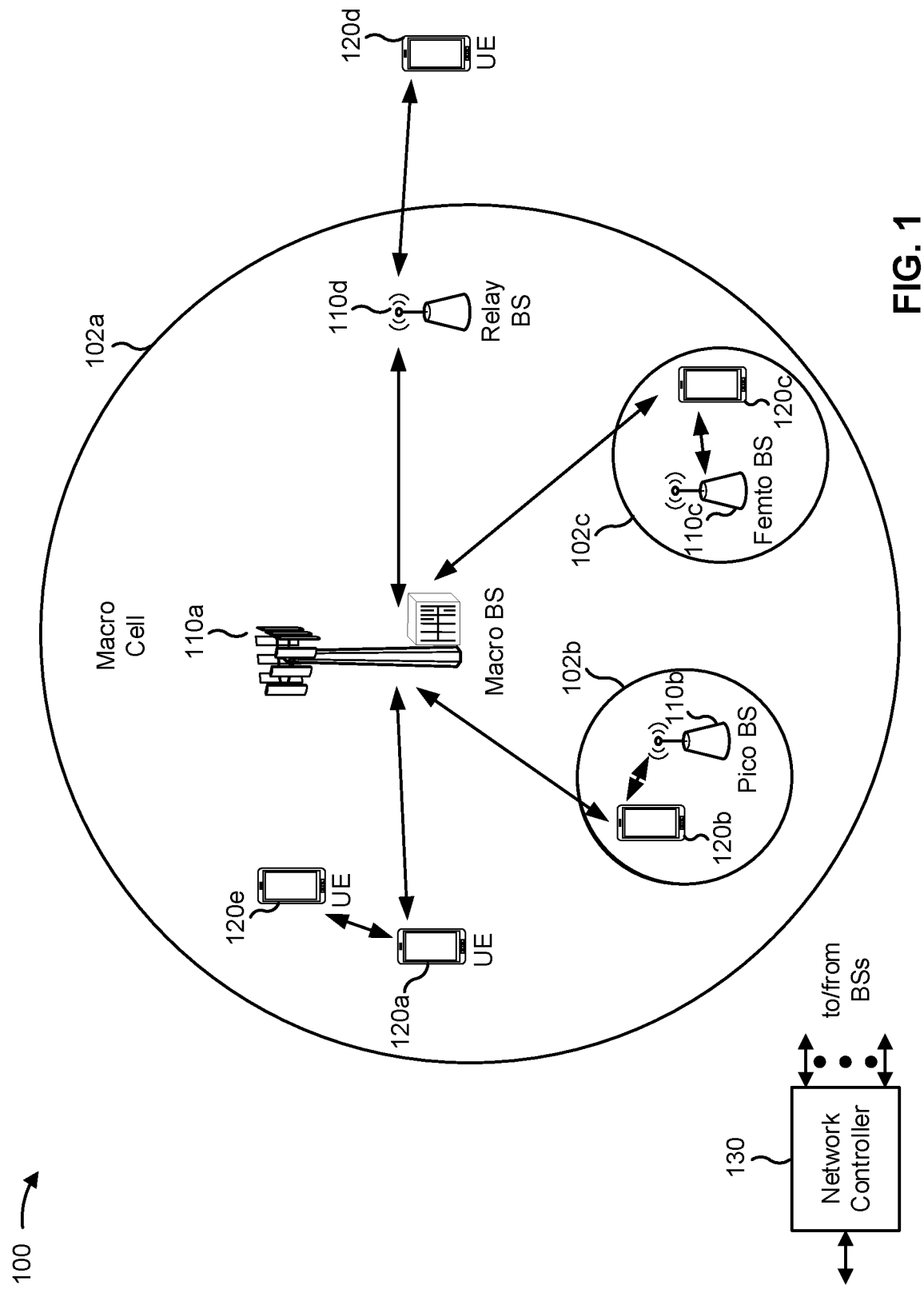
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. In some cases, a UE may access the air interface by performing a random access procedure, such as a physical random access (PRACH) procedure, and/or the like. For example, the random access procedure may include a two-step random access procedure or a four-step random access procedure. "RACH procedure" may be used interchangeably with "random access procedure" herein.

Base stations are not the only entities that may function as a scheduling entity. That is, in some examples, a UE may function as a scheduling entity, scheduling resources for one or more subordinate entities (e.g., one or more other UEs). In these examples, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
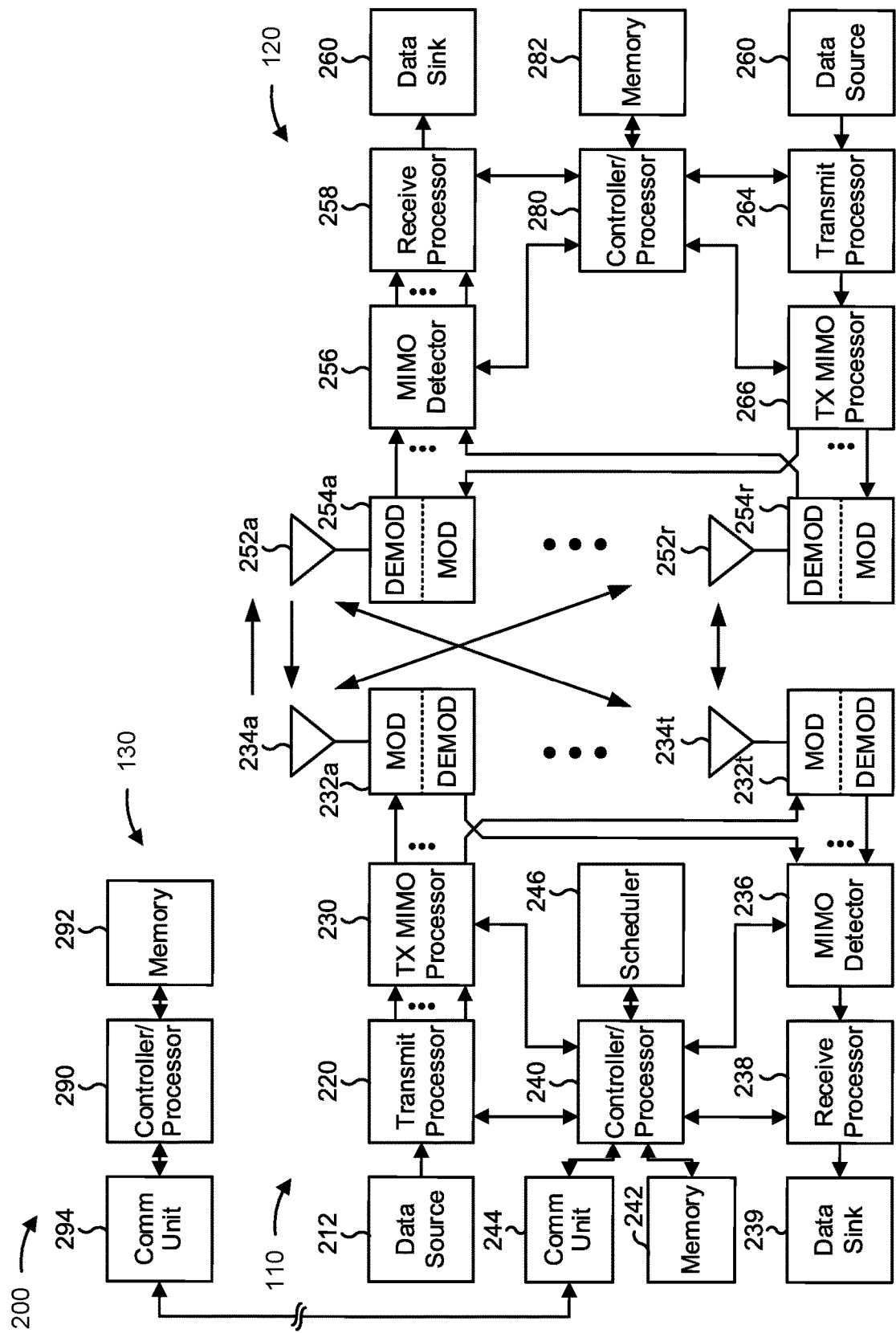
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280.

Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with indication for two-step RACH fallback to four-step RACH, as described in more detail elsewhere herein. For example, controller/processor 240 of base station 110, controller/processor 280 of UE 120, and/or any other component(s) of FIG. 2 may perform or direct operations of, for example, method 1000 of FIG. 10, method 1300 of FIG. 13, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

Figure 3:
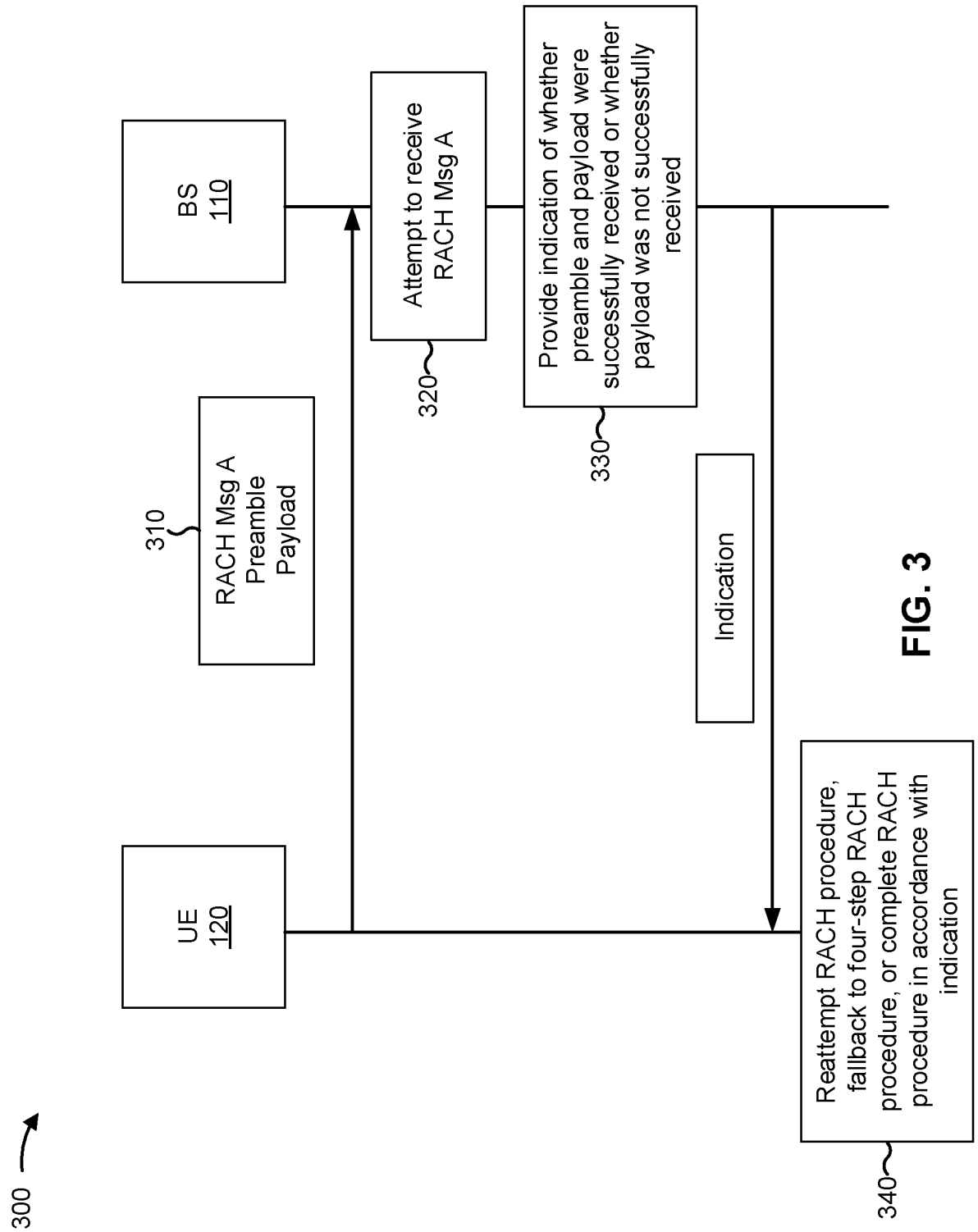
FIG. 3 is a diagram illustrating an example of an indication for a two-step random access fallback procedure.

FIG. 3 is a diagram illustrating an example 300 of indication for a two-step random access fallback procedure. As shown, example 300 includes a UE 120 and a BS 110.

As shown in FIG. 3, and by reference number 310, the UE 120 may transmit a RACH Message (Msg) A to the BS 110. For example, the UE 120 may transmit the RACH Message A as part of a random access procedure, an initial access procedure, and/or the like. The RACH Message A may be associated with a two-step RACH procedure. As further shown, the RACH Message A may include a preamble and a payload. The preamble may be encoded based at least in part on a random access radio network temporary identifier, and/or may identify the UE 120. The payload may include a physical uplink shared channel (PUSCH), and may include contention information for the UE 120. The BS 110 may perform contention resolution based at least in part on the RACH Message A, as described in more detail below.

As shown by reference number 320, the BS 110 may attempt to receive the RACH Message A. For example, the BS 110 may attempt to receive the preamble and the payload. Successfully receiving, decoding, and processing the preamble may be referred to herein as successfully receiving the preamble, and successfully receiving, decoding, and processing the payload may be referred to herein as successfully receiving the payload. The BS 110 may be more likely to successfully receive the preamble than the payload, since the preamble is shorter and more simply encoded than the payload. Thus, three outcomes of the decoding may be expected: a first case, referred to as Case A, wherein the preamble and the payload are detected and successfully received by the BS 110; a second case, referred to as Case B, wherein the preamble is successfully received but the payload is not successfully received, and a third case, referred to as Case C, wherein neither the preamble nor the payload is successfully received. For case C, a MAC subheader that includes a backoff indicator may be used to indicate the outcome in RACH Message B. The techniques and apparatuses described herein provide signaling to differentiate Case A and Case B and to indicate whether the UE should reattempt the RACH procedure, fall back to a four-step RACH procedure, or proceed with random access since the preamble and payload are successfully received.

As shown by reference number 330, the BS 110 may provide an indication of whether the preamble and payload were successfully received (e.g., Case A) or whether the payload was not successfully received (e.g., Case B). The indication may indicate (e.g., implicitly or explicitly) whether the UE 120 is to complete the two-step random access procedure, reattempt the random access procedure, or fall back to a four-step RACH procedure. Particular structures of the indication are described in more detail in connection with FIGS. 3-9. In some aspects, the indication may be provided in a random access response (RAR), such as a RACH Message B, or in association with a random access response, as described in more detail in connection with FIGS. 3-9. In some aspects, the indication may be provided in a RACH Message 2 (e.g., associated with a four-step RACH procedure), as also described in more detail in connection with FIGS. 3-9.

As shown by reference number 340, the UE 120 may selectively reattempt the RACH procedure or fall back to the four-step RACH procedure (e.g., when the indication is associated with Case B), or may complete the RACH procedure (e.g., when the indication is associated with Case A), in accordance with the indication. As used herein, reattempting the RACH procedure may refer to selecting another RACH preamble and transmitting another RACH message (e.g., a RACH Message A associated with a two-step RACH procedure or a RACH Message 1 associated with a four-step RACH procedure). When the UE 120 reattempts random access using the two-step RACH procedure, the UE 120 may retransmit the payload in RACH Message A. When the UE 120 falls back to the four-step RACH procedure, the UE 120 may retransmit the payload in RACH Message 3. In some aspects, the UE 120 may reattempt the random access based at least in part on determining that the indication indicates that the payload was not successfully received and/or that the contention of the UE 120 with another UE was resolved in favor of the other UE 120. When the UE 120 falls back to the four-step RACH procedure, the UE 120 may transmit the payload using a RACH Message 3 of the four-step RACH procedure, thereby providing a second attempt at transmitting the payload without retransmitting the preamble. When the UE 120 completes the RACH procedure, the UE 120 may receive radio resource control (RRC) information, may configure an RRC connection based at least in part on the indication, and/or the like.

As indicated above, FIG. 3 is provided as an example. Other examples may differ from what is described with respect to FIG. 3.

Figure 4:
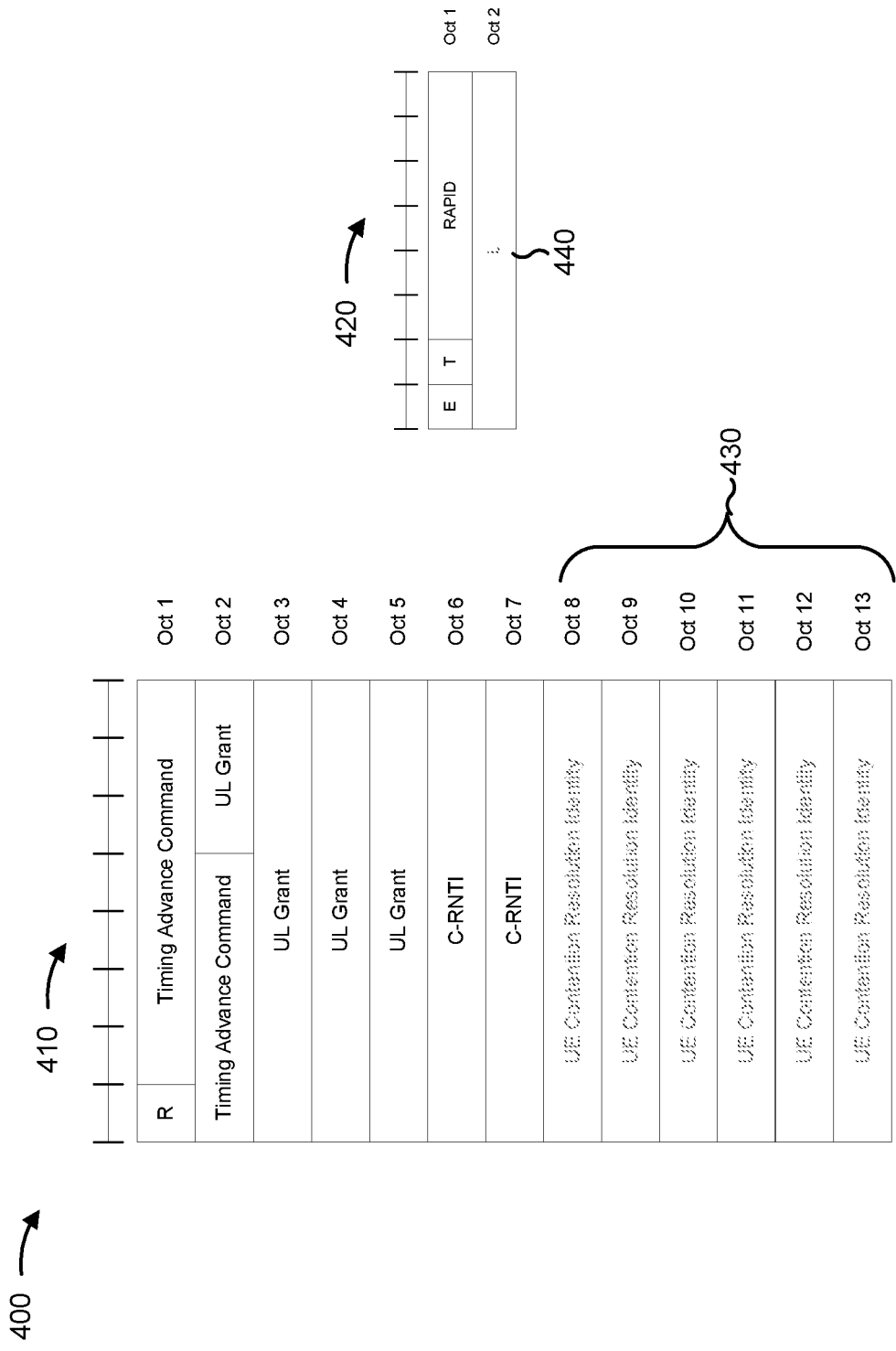
FIG. 4 is a diagram illustrating an example of a media access control messaging structure for an indication as described in connection with FIG. 3.

FIG. 4 is a diagram illustrating an example 400 of a media access control messaging structure for an indication as described in connection with FIG. 3. The indication described in connection with example 400 may be included in a RAR from BS 110 to UE 120. As shown, example 400 shows a MAC payload 410 and a corresponding MAC subheader 420. The indication may be provided using the UE contention resolution identities shown by reference number 430. For example, the UE contention resolution identities may identify a UE whose payload was successfully received by the BS 110. For example, a contention resolution identity may identify a UE identifier of the corresponding UE 120. A length of the RAR may be indicated by the value L in the MAC subheader 420, shown by reference number 440.

If the BS 110 successfully receives the preamble and the payload for a UE 120, then the BS 110 may transmit the indication as a RACH Message B using the structure shown by example 400. If the preamble is received successfully and the payload is not received successfully, then the BS 110 may transmit a RACH Message 2 (e.g., associated with a four-step RACH procedure), which may be multiplexed in a MAC packet data unit (PDU) with a RACH Message B for a UE for which the payload and preamble were both successfully received. Additionally, or alternatively, the BS 110 may transmit a RACH Message B with no UE contention resolution identities, which may indicate to a recipient UE 120 that the corresponding payload was not received successfully, or that the recipient UE 120 was not selected at a contention resolution stage of the BS 110.

If the UE 120 receives the RACH Message B with a UE contention resolution identity that matches the UE 120, then the UE 120 may determine that the two-step RACH procedure is successful. If the UE 120 receives the RACH Message B and the RACH Message B does not include UE contention resolution information or the UE contention resolution information does not identify the UE 120, then the UE 120 may reattempt the random access using the two-step RACH procedure (e.g., by retransmitting RACH Message A on a subsequent RACH occasion) or using a four-step RACH procedure (e.g., by transmitting a preamble associated with the UE 120 on the subsequent RACH occasion). If the UE 120 receives a RACH Message 2, then the UE 120 may use a timing advance command, an uplink grant, and a temporary cell radio network temporary identifier (TC-RNTI) of the RACH Message 2 to retransmit a payload of RACH Message A using a RACH Message 3 of the four-step RACH procedure. In other words, the UE 120 may fall back to the four-step RACH procedure when the UE 120 receives the indication as RACH Message 2 of the four-step RACH procedure.

In some aspects, when the payload and the preamble are successfully received, if the payload includes contention resolution information (e.g., in a common control channel (CCCH) service data unit (SDU)) in RACH Message A, the BS 110 may provide, in RACH Message B, information identifying a timing advance command, an uplink grant, a cell radio network temporary identifier (C-RNTI), or a UE contention resolution identity. Furthermore, the BS 110 may use the MAC subheader shown by reference number 420.

In some aspects, when the payload is not successfully received, the UE 120 may receive a RACH Message B in the format shown by reference number 410, but the contention resolution identity of the RACH Message B will not match the UE 120. In this case, the UE 120 may ignore the RACH Message B and may reattempt the random access using the two-step RACH procedure or the four-step RACH procedure.

In some aspects, if a UE 120 receives a RACH Message 2 or a RACH Message B without the UE contention resolution identity field (that identifies the UE 120), the UE 120 may use a timing advance (TA) command, an uplink grant, and a TC-RNTI of the RACH Message 2 or the RACH Message B to retransmit the payload of the RACH Message A, and thus fall back to the remaining steps of the four-step RACH procedure.

For an example of how the messaging structure described in connection with example 400 may be used in connection with multiple UEs, refer to the description accompanying FIG. 5, below.

As indicated above, FIG. 4 is provided as an example. Other examples may differ from what is described with respect to FIG. 4.

Figure 5:
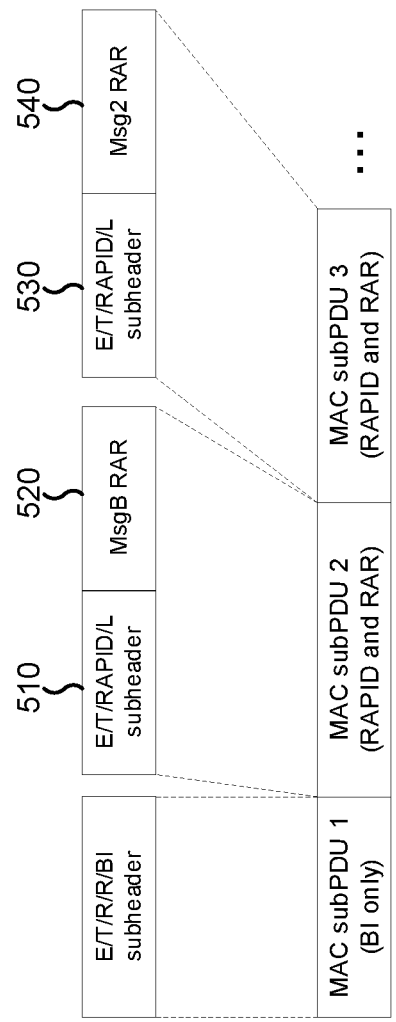
FIG. 5 is a diagram illustrating an example of a media access control messaging structure for multiple UEs.

FIG. 5 is a diagram illustrating an example 500 of a media access control messaging structure for multiple UEs. Example 500 includes a random access response that includes a set of MAC sub-packet-data-units (subPDUs) for a set of UEs that attempt random access with regard to a BS 110. The BS 110 may provide indications for the set of UEs that indicate whether each UE's preamble and/or payload was successfully received. For the purpose of FIG. 5, assume that, on a same RACH occasion, a UE1 and a UE2 use a first preamble index and a UE3 and a UE4 use a second preamble index, and assume that the UE1, the UE2, the UE3, and the UE4 perform a two-step RACH procedure. Assume further that the BS 110 successfully receives the preambles of all four UEs, and that the BS 110 successfully receives the payload of only the UE1.

In this case, the BS 110 may provide a first MAC subheader for the UE1 and the UE2, shown by reference number 510, that indicates a length of a corresponding RACH Message B (using the variable L, shown in the MAC subheader). The corresponding RACH Message B, shown by reference number 520, may include a UE contention resolution identity of the UE1 (not shown), since the UE1's payload was successfully received and the UE2's payload was not successfully received, thereby causing the BS 110 to resolve the contention in favor of the UE1. Furthermore, the BS 110 may provide a second MAC subheader for the UE3 and the UE4, shown by reference number 530. As shown, the second MAC subheader may indicate a length of a corresponding RACH Message B or RACH Message 2 (using the variable L). As shown by reference number 540, the BS 110 may provide a RACH Message 2 (or may provide a RACH Message B without a UE contention resolution identity, which is not shown) in connection with the MAC subheader 530 that identifies the length of the corresponding RACH Message 2, thus indicating that the payloads of UE3 and UE4 were not received. Thus, UE3 and UE4 may fall back to the four-step RACH procedure to retransmit the payload of RACH Message A.

As indicated above, FIG. 5 is provided as an example. Other examples may differ from what is described with respect to FIG. 5.

Figure 6:
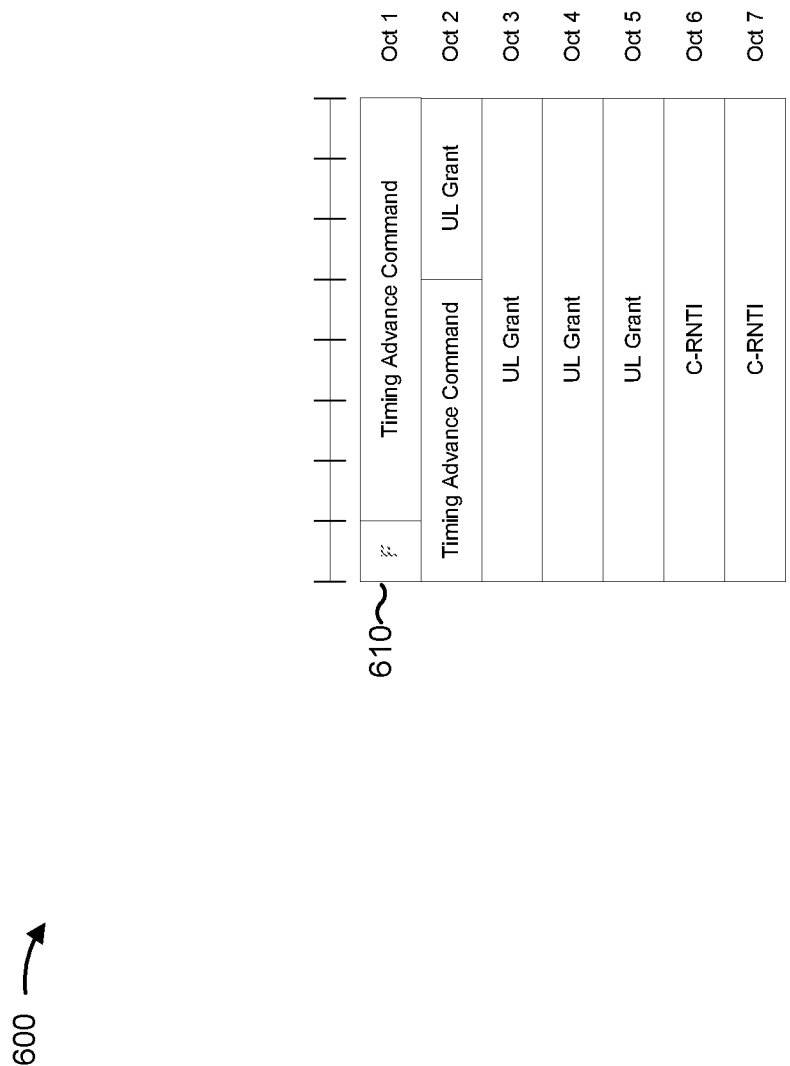
FIG. 6 is a diagram illustrating an example of a media access control messaging structure for an indication as described in connection with FIG. 3.

FIG. 6 is a diagram illustrating an example 600 of a media access control messaging structure for an indication as described in connection with FIG. 3. Example 600 shows a MAC payload for a RACH Message B. In the MAC payload, an indication bit, shown by reference number 610, is used as the indicator (e.g., by switching a value of F). In this case, if a BS 110 receives a preamble and a payload of a UE 120, the BS 110 may set F to a first value (e.g., 0) in RACH Message B. If the BS 110 does not successfully receive the payload, then the BS 110 may set F to a second value (e.g., 1).

If a UE 120 receives a RACH Message B with a fallback indicator of the first value, then the UE 120 may check a value of a contention resolution MAC control element (CE). If the contention resolution identity matches the UE 120, then the UE 120 may complete the two-step RACH procedure. If the contention resolution identity does not match the UE 120, then the UE 120 may reattempt the RACH procedure using a two-step RACH procedure or a four-step RACH procedure. If a UE 120 receives a RACH message B with a fallback indicator of the second value, then the UE 120 may use a TA command, an uplink grant, and a C-RNTI of the RACH Message B to retransmit a payload of the RACH Message A (e.g., by falling back to the four-step RACH procedure).

In the case when the payload and preamble are successfully received, the payload may include contention resolution information (e.g., in a CCCH SDU) in RACH Message A, and RACH Message B may identify a TA command, an uplink grant, a C-RNTI, and a MAC subheader with a RAPID and a UE contention resolution MAC CE that identifies a UE 120 from which the payload and preamble were successfully received.

In the case when the payload is not successfully received, the RACH Message B may be transmitted by the BS 110 with a MAC subheader that includes a RAPID. If the indication bit is set to a first value, then the UE 120 may ignore the RACH Message B, and may reattempt transmission using the two-step or the four-step RACH procedure. If the indication bit is set to a second value, then the UE 120 may use a TA command, an uplink grant, and a C-RNTI identified by RACH Message B to retransmit a payload of RACH Message A in order to perform a fallback to the four-step RACH procedure.

For an example of how the messaging structure described in connection with example 600 may be used in connection with multiple UEs, refer to the description accompanying FIG. 7, below.

As indicated above, FIG. 6 is provided as an example. Other examples may differ from what is described with respect to FIG. 6.

Figure 7:
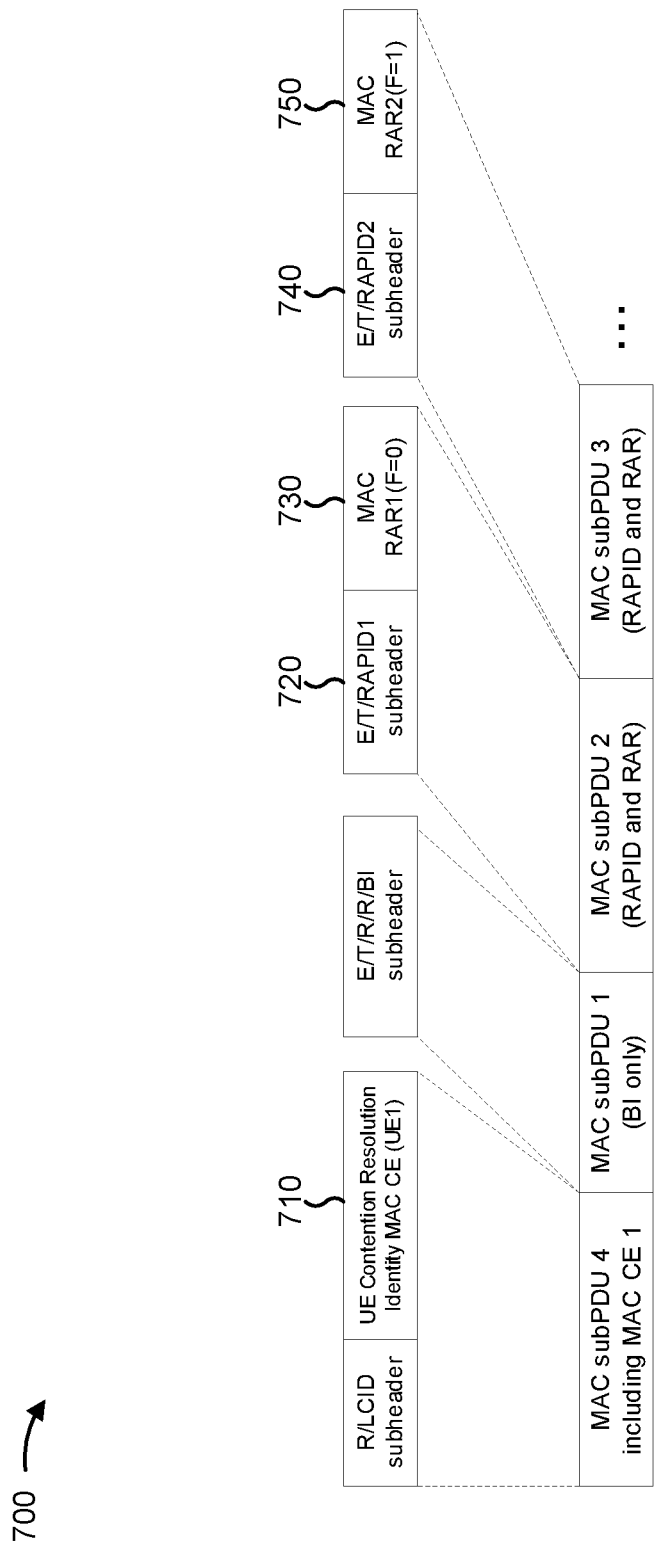
FIG. 7 is a diagram illustrating an example of a media access control messaging structure for multiple UEs.

FIG. 7 is a diagram illustrating an example 700 of a media access control messaging structure for multiple UEs. Example 700 includes a random access response that includes a set of MAC sub-packet-data-units (subPDUs) for a set of UEs that attempt random access with regard to a BS 110. The BS 110 may provide indications for the set of UEs that indicate whether each UE's preamble and/or payload was successfully received. For the purpose of FIG. 7, assume that, on a same RACH occasion, a UE1 and a UE2 use a first preamble index and a UE3 and a UE4 use a second preamble index, and assume that the UE1, the UE2, the UE3, and the UE4 perform a two-step RACH procedure. Assume further that the BS 110 successfully receives the preambles of all four UEs, and that the BS 110 successfully receives the payload of only the UE1.

As shown in FIG. 7, and by reference number 710, the BS 110 may provide UE contention resolution information that identifies the UE1 based at least in part on successfully decoding the payload of the UE1. Furthermore, as shown by reference number 720, a MAC subheader associated with UE1 and UE2 may identify a RAPID of UE1 and UE2 (e.g., RAPID1), and, as shown by reference number 730, the random access response associated with UE1 and UE2 may include an indication bit set to a first value (e.g., F=0), which may indicate that the UE1 and the UE2 are not to perform the fallback to the four-step RACH procedure. Accordingly, the UE1 may determine that the two-step RACH procedure is successful (e.g., based at least in part on the UE contention resolution identity MAC CE identifying the UE1 and the indication bit being set to the first value) and the UE2 may determine that the UE2 is to reattempt the RACH procedure (e.g., based at least in part on the UE contention resolution identity MAC CE not identifying the UE2 and the indication bit being set to the first value).

As shown by reference number 740, a MAC subheader associated with UE3 and UE4 may identify a RAPID of UE3 and UE4 (e.g., RAPID2). As shown by reference number 750, the random access response associated with UE3 and UE4 may include an indication bit set to a second value (e.g., F=1), which may indicate that UE3 and UE4 are to fall back to the four-step RACH procedure.

As indicated above, FIG. 7 is provided as an example. Other examples may differ from what is described with respect to FIG. 7.

Figure 8:
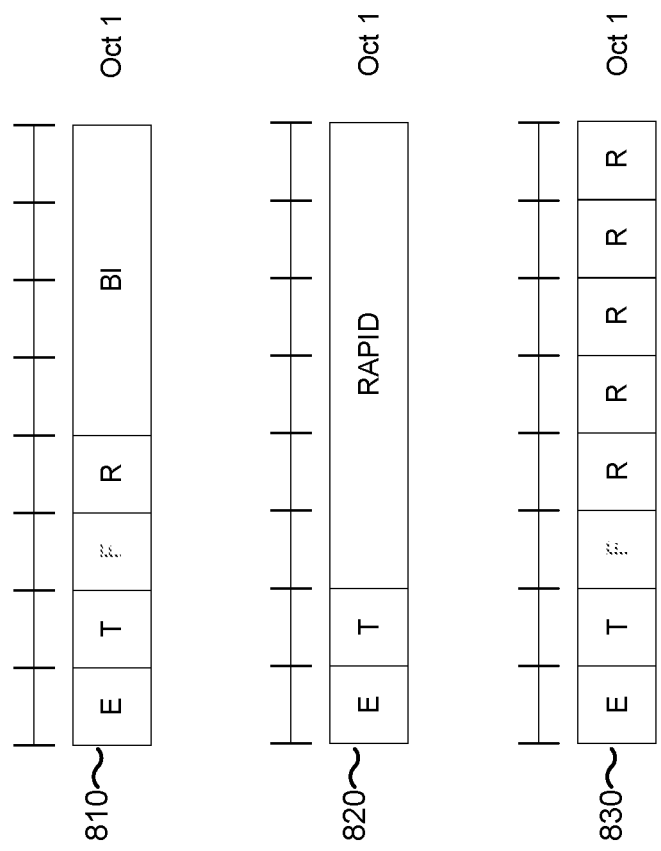
FIG. 8 is a diagram illustrating an example of a media access control messaging structure for an indication as described in connection with FIG. 3.

FIG. 8 is a diagram illustrating an example 800 of a media access control messaging structure for an indication as described in connection with FIG. 3. In example 800, if the preamble and the payload for a UE 120 are received successfully, a MAC subheader that does not include a RAPID may be used for the RACH Message B. If the payload is not received successfully, then a MAC subheader that includes a RAPID may be used for the RACH message B. The UE 120 may determine whether the BS 110 successfully received the payload based at least in part on whether the MAC subheader associated with the UE 120 includes a RAPID associated with the UE 120, and based at least in part on whether a contention resolution MAC CE of the UE 120 is included in the RACH Message B. For example, if the contention resolution MAC CE of the UE 120 matches a UE identifier of the UE 120, and if the MAC subheader does not include a RAPID, then the UE 120 may determine that the two-step RACH procedure was successful. If the MAC subheader identifies a RAPID associated with the UE 120, then the UE 120 may identify the RAPID, and may use a TA command, an uplink grant, and a C-RNTI of the RACH Message B to retransmit the payload in order to fall back to the four-step RACH. In some aspects, the MAC CEs and the corresponding MAC subheaders together with the random access responses are provided in sequence. For example, if UE1's MAC CE is the first MAC CE and UE2's MAC CE is the second MAC CE, then UE1's random access response may use the first subPDU, and UE2's random access response may use the second subPDU.

Reference number 810 illustrates a first MAC subheader with a backoff indicator (BI) and no RAPID. The values T and F of the MAC subheader may indicate whether the first MAC subheader is to include a backoff indicator, a RAPID, or a set of reserved bits. Here, T may be associated with a first value and F may be associated with the first value, indicating that the first MAC subheader is to include the backoff indicator and no RAPID.

Reference number 820 illustrates a second MAC subheader with a RAPID, which may be used to indicate that the UE 120 is to retransmit the payload. In the second MAC subheader, T may be associated with a second value, indicating that the second MAC subheader is to include a RAPID.

Reference number 830 illustrates a third MAC subheader with one or more reserved bits and no RAPID, which may be used, in conjunction with a contention resolution MAC CE, to indicate that the payload was successfully received. Here, the value T may be set to the first value and F may be set to a second value, which may indicate that the third MAC subheader is to include the one or more reserved bits and no RAPID or backoff indicator.

For an example of how the messaging structure described in connection with example 800 may be used in connection with multiple UEs, refer to the description accompanying FIG. 9, below.

As indicated above, FIG. 8 is provided as an example. Other examples may differ from what is described with respect to FIG. 8.

Figure 9:
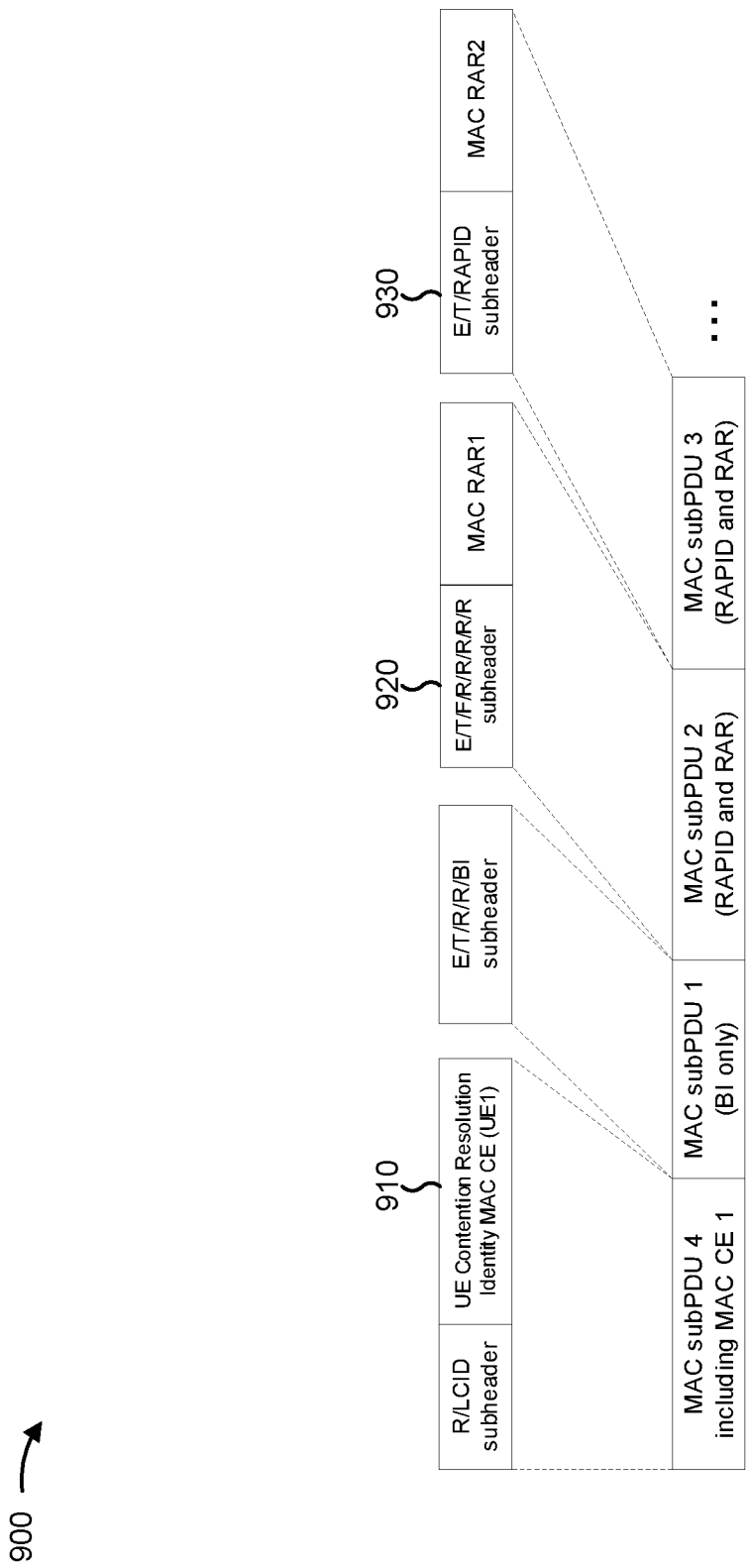
FIG. 9 is a diagram illustrating an example of a media access control messaging structure for multiple UEs.

FIG. 9 is a diagram illustrating an example 900 of a media access control messaging structure for multiple UEs.

Example 900 includes a random access response that includes a set of MAC sub-packet-data-units (subPDUs) for a set of UEs that attempt random access with regard to a BS 110. The BS 110 may provide indications for the set of UEs that indicate whether each UE's preamble and/or payload was successfully received. For the purpose of FIG. 9, assume that, on a same RACH occasion, a UE1 and a UE2 use a first preamble index and a UE3 and a UE4 use a second preamble index, and assume that the UE1, the UE2, the UE3, and the UE4 perform a two-step RACH procedure. Assume further that the BS 110 successfully receives the preambles of all four UEs, and that the BS 110 successfully receives the payload of only the UE1.

As shown in FIG. 9, and by reference number 910, as part of a random access response, the BS 110 may provide UE contention resolution information that identifies the UE1 based at least in part on successfully decoding the payload of the UE1. As shown by reference number 920, a MAC subheader associated with the UE1 and the UE2 may not include a RAPID, indicating that the BS 110 successfully received a payload associated with UE1 or UE2. Accordingly, the UE1 may complete the two-step RACH procedure. The UE2 may not receive the random access response, since the random access response does not include the RAPID for the UE2. As shown by reference number 930, a MAC subheader associated with the UE3 and the UE4 may include a RAPID associated with the UE3 and the UE4, so the UE3 and the UE4 may accordingly fall back to the four-step RACH procedure.

In some aspects, the procedures described in connection with examples 400 and 500, 600 and 700, and 800 and 900 may be performed in combination. For example, consider the combination of example 400/500 and 800/900. In this case, if the preamble and the payload in RACH Message A are received successfully, the BS may transmit a RACH Message B that includes UE contention resolution information, as described in more detail in connection with examples 400 and 500. Furthermore, the RACH Message B may include a MAC subheader without a RAPID, with a value of F that indicates that a backoff indicator is not to be included in the MAC subheader, and a value of L that indicates a length of the RACH Message B. In some aspects, examples 400/500, 600/700, and 800/900 may all be combined, or any pair of examples 400/500, 600/700, and 800/900 may be combined.

As indicated above, FIG. 9 is provided as an example. Other examples may differ from what is described with respect to FIG. 9.

Figure 10:
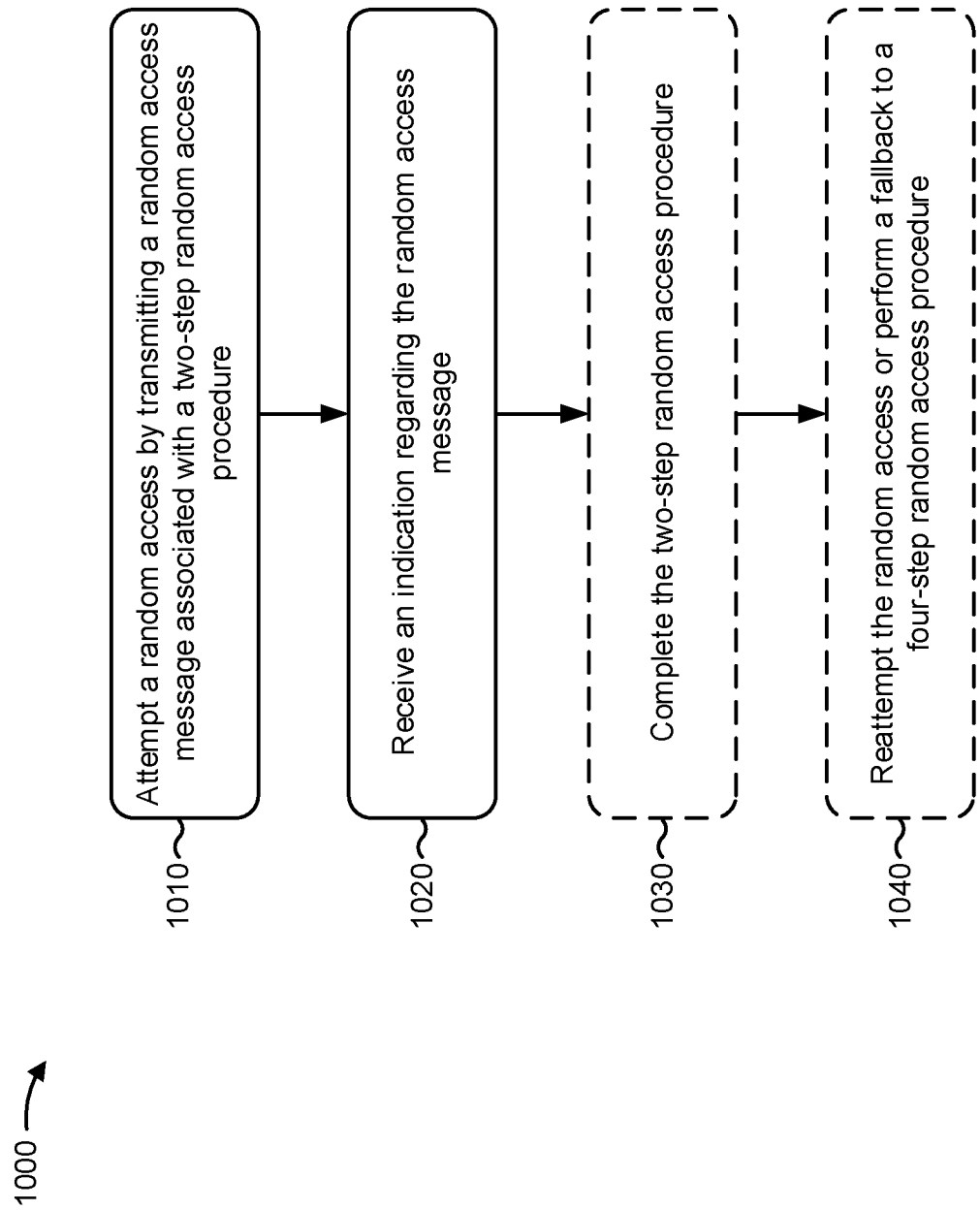
FIG. 10 is a flow chart of a method of wireless communication.

FIG. 10 is a flow chart of a method 1000 of wireless communication. The method may be performed by a UE (e.g., the UE 120 of FIG. 1, the apparatus 1102/1102', and/or the like).

At 1010, the UE (e.g., using controller/processor 280, transmit processor 264, TX MIMO processor 266, MOD 254, antenna 252, and/or the like) may attempt a random access by transmitting a random access message associated with a two-step random access procedure. For example, the random access message may include a RACH Message A. The random access message may include a preamble and a payload.

At 1020, the UE (e.g., using antenna 252, DEMOD 254, MIMO detector 256, receive processor 258, controller/processor 280, and/or the like) may receive an indication regarding the random access message. For example, the indication may indicate that a preamble of the random access message and a payload of the random access message were successfully received, or that the payload was not successfully received.

At 1030, the UE (e.g., using controller/processor 280, transmit processor 264, TX MIMO processor 266, MOD 254, antenna 252, and/or the like) may complete the two-step random access procedure based at least in part on determining that the indication indicates that the preamble of the random access message and the payload of the random access message were successfully received. For example, the UE may establish an RRC connection with the base station, may camp on a cell provided by the base station, and/or the like.

At 1040, the user equipment (e.g., using controller/processor 280, transmit processor 264, TX MIMO processor 266, MOD 254, antenna 252, and/or the like) may reattempt the random access or perform a fallback to a four-step random access procedure based at least in part on determining that the indication indicates that the payload was not successfully received. For example, the UE may reattempt random access using a two-step random access procedure or a four-step random access procedure. In this case, the UE may retransmit a preamble and a payload in accordance with the two-step random access procedure or the four-step random access procedure. In some aspects, the UE may perform a fallback to the four-step random access procedure. For example, the UE may retransmit a payload of the random access message as RACH Message 3 of the four-step RACH procedure. As used herein, reattempting random access may refer to transmitting a preamble and/or a payload of a random access message after the preamble and/or the payload has already been transmitted by the user equipment (e.g., on the same RACH occasion or on a different RACH occasion).

In a first aspect, the indication comprises a random access response associated with the two-step random access procedure, and a payload of the random access response includes contention resolution information that identifies a particular UE from which the payload of the random access message was successfully received. In a second aspect, alone or in combination with the first aspect, the method further comprises reattempting the random access based at least in part on determining that contention resolution information within the random access response does not identify the UE, the UE is configured to reattempt the random access procedure. In a third aspect, alone or in combination with the first aspect and/or the second aspect, a media access control (MAC) subheader of the random access response indicates a length of the random access response. In a fourth aspect, alone or in combination with one or more of the first through third aspects, the random access response indicates that the payload of the random access message was not successfully received based at least in part on an absence of contention resolution information that identifies the UE in the random access response.

In a fifth aspect, alone or in combination with one or more of the first through fourth aspects, a MAC subheader of the random access response includes a set of bits that indicate whether a backoff indicator is included in the MAC subheader. In a sixth aspect, alone or in combination with one or more of the first through fifth aspects, the indication comprises a random access response associated with the two-step random access procedure, and contention resolution for the UE is based at least in part on a control channel that is addressed to the UE using a C-RNTI of the UE. In a seventh aspect, alone or in combination with one or more of the first through sixth aspects, a payload of the random access response does not include the C-RNTI. In an eighth aspect, alone or in combination with one or more of the first through seventh aspects, the random access response includes an uplink grant. In a ninth aspect, alone or in combination with one or more of the first through eighth aspects, the random access response does not include an uplink grant. In a tenth aspect, alone or in combination with one or more of the first through ninth aspects, the indication comprises a random access response associated with the two-step random access procedure, and the random access response identifies a C-RNTI of the UE. In an eleventh aspect, alone or in combination with one or more of the first through tenth aspects, a MAC subheader of the random access response includes a set of bits that indicate that the random access response is associated with a contention resolution for a connected-mode UE. In a twelfth aspect, alone or in combination with one or more of the first through eleventh aspects, the random access response includes an uplink grant. In a thirteenth aspect, alone or in combination with one or more of the first through twelfth aspects, the random access response does not include an uplink grant. In a fourteenth aspect, alone or in combination with one or more of the first through thirteenth aspects, the UE is in an idle mode or an inactive mode when the random access is attempted. In a fifteenth aspect, alone or in combination with one or more of the first through fourteenth aspects, the indication is associated with a MAC subheader that includes a backoff indicator and a set of bits that indicate that the MAC subheader includes the backoff indicator.

In a sixteenth aspect, alone or in combination with one or more of the first through fifteenth aspects, the indication comprises a second message of the four-step random access procedure. In a seventeenth aspect, alone or in combination with one or more of the first through sixteenth aspects, the second message indicates that the payload was not successfully received. In an eighteenth aspect, alone or in combination with one or more of the first through seventeenth aspects, the method further comprises performing the fallback to the four-step random access procedure based at least in part on receiving the second message.

In a nineteenth aspect, alone or in combination with one or more of the first through eighteenth aspects, the indication comprises an indication bit in a MAC payload of a random access response message. In a twentieth aspect, alone or in combination with one or more of the first through nineteenth aspects, the indication bit indicates whether to perform the fallback to the four-step random access procedure. In a twenty-first aspect, alone or in combination with one or more of the first through twentieth aspects, based at least in part on the indication bit indicates not to perform the fallback to the four-step random access procedure, the UE is configured to complete the two-step random access procedure based at least in part on contention resolution information of the random access response message identifying the UE. In a twenty-second aspect, alone or in combination with one or more of the first through twenty-first aspects, based at least in part on the indication bit indicating not to perform the fallback to the four-step random access procedure, the UE is configured to reattempt the random access based at least in part on contention resolution information of the random access response message not identifying the UE.

In a twenty-third aspect, alone or in combination with one or more of the first through twenty-second aspects, a MAC subheader of the indication does not include a preamble identifier based at least in part on the preamble and the payload being successfully received. In a twenty-fourth aspect, alone or in combination with one or more of the first through twenty-third aspects, the MAC subheader does not include the preamble identifier, and a contention resolution MAC control element of the indication identifies a particular UE for which the payload and the preamble were successfully received, wherein contention resolution MAC control elements, including the contention resolution MAC control element, and corresponding MAC subheaders, including the MAC subheader, in connection with corresponding random access responses, are provided in sequence. In a twenty-fifth aspect, alone or in combination with one or more of the first through twenty-fourth aspects, the MAC subheader includes a first bit that indicates whether a backoff indicator or the preamble identifier is to be included in the MAC subheader and a second bit that indicates whether a field of the MAC subheader is to be used for the backoff indicator or for one or more reserved bits. In a twenty-sixth aspect, alone or in combination with one or more of the first through twenty-fifth aspects, a media access control (MAC) subheader of the random access response includes a set of bits that indicate that the random access response is associated with a contention resolution for an idle-mode UE or an inactive-mode UE.

In a twenty-sixth aspect, alone or in combination with one or more of the first through twenty-fifth aspects, based at least in part on the preamble and the payload being successfully received, the indication comprises a random access response associated with the two-step random access procedure that includes contention resolution information in a payload of the random access response, wherein the indication includes a MAC subheader that does not include a preamble identifier. In a twenty-seventh aspect, alone or in combination with one or more of the first through twenty-sixth aspects, the MAC subheader indicates a length of the random access response and whether the MAC subheader is to include a backoff indicator.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

Figure 11:
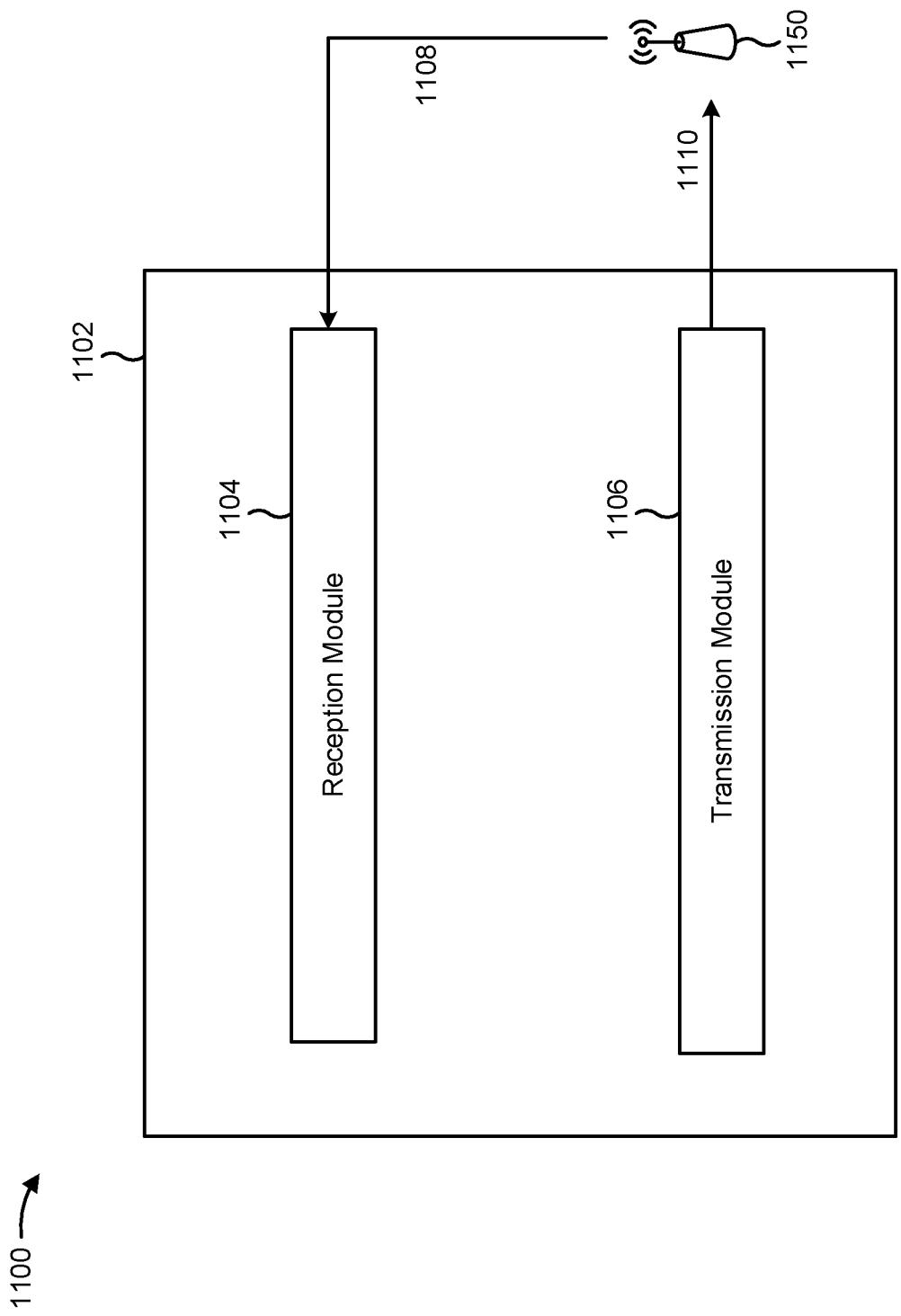
FIG. 11 is a conceptual data flow diagram illustrating the data flow between different modules/means/components in an example apparatus.

FIG. 11 is a conceptual data flow diagram 1100 illustrating the data flow between different modules/means/components in an example apparatus 1102. The apparatus 1102 may be a UE. In some aspects, the apparatus 1102 includes a reception module 1104 and/or a transmission module 1106.

The reception module 1104 may receive signals 1108 from a base station 1150 (e.g., BS 110 and/or the like). The signals 1108 may include a random access response, such as a RACH Message B or a RACH Message 2 including an indication of a result of decoding a RACH Message A, as described in more detail elsewhere herein. In some aspects, the reception module 1104 may receive an indication that indicates that a preamble of the random access message and a payload of the random access message were successfully received, or that the payload was not successfully received. The transmission module 1106 may transmit signals 1110 to the base station 1150. The signals 1110 may include a random access message, such as a RACH Message A, a RACH Message 3, and/or the like. In some aspects, the transmission module 1106 may transmit a random access message associated with a two-step random access procedure, complete the two-step RACH procedure, reattempt random access, or perform a fallback to a four-step random access procedure, as described elsewhere herein.

The apparatus may include additional modules that perform each of the blocks of the algorithm in the aforementioned method 1000 of FIG. 10 and/or the like. Each block in the aforementioned method 1000 of FIG. 10 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 11 are provided as an example. In practice, there may be additional modules, fewer modules, different modules, or differently arranged modules than those shown in FIG. 11. Furthermore, two or more modules shown in FIG. 11 may be implemented within a single module, or a single module shown in FIG. 11 may be implemented as multiple, distributed modules. Additionally, or alternatively, a set of modules (e.g., one or more modules) shown in FIG. 11 may perform one or more functions described as being performed by another set of modules shown in FIG. 11.

Figure 12:
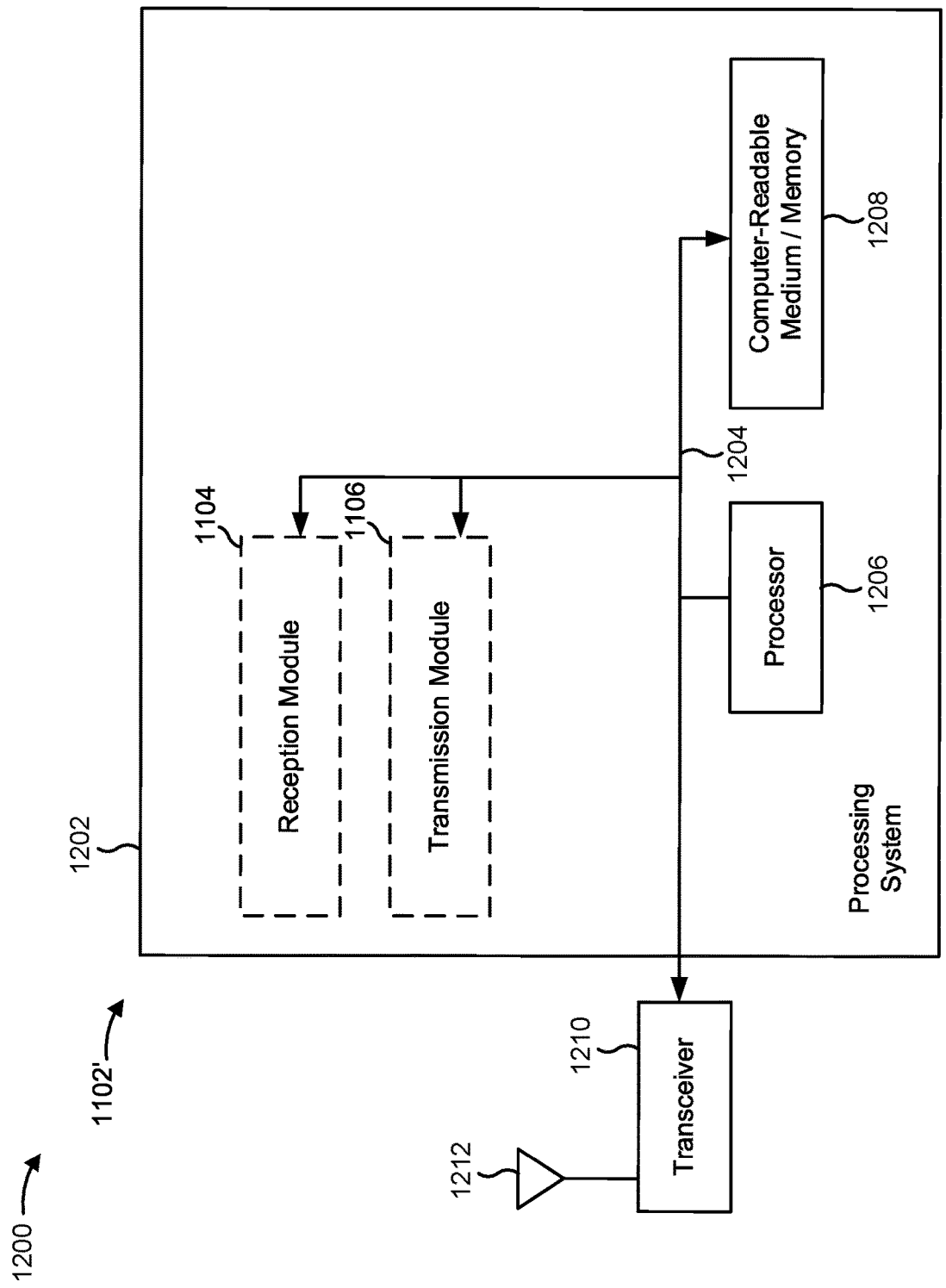
FIG. 12 is a diagram illustrating an example of a hardware implementation for an apparatus employing a processing system.

FIG. 12 is a diagram 1200 illustrating an example of a hardware implementation for an apparatus 1102' employing a processing system 1202. The apparatus 1102' may be a UE.

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware modules, represented by the processor 1206, the modules 1104, 1106, and the computer-readable medium/memory 1208. The bus 1204 may also link various other circuits such as timing sources, peripherals, voltage regulators, and power management circuits, which are well known in the art, and therefore will not be described any further.

The processing system 1202 may be coupled to a transceiver 1210. The transceiver 1210 is coupled to one or more antennas 1212. The transceiver 1210 provides a means for communicating with various other apparatuses over a transmission medium. The transceiver 1210 receives a signal from the one or more antennas 1212, extracts information from the received signal, and provides the extracted information to the processing system 1202, specifically the reception module 1104. In addition, the transceiver 1210 receives information from the processing system 1202, specifically the transmission module 1106, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described herein for any particular apparatus. The computer-readable medium/memory 1208 may also be used for storing data that is manipulated by the processor 1206 when executing software. The processing system further includes at least one of the modules 1104 and 1106. The modules may be software modules running in the processor 1206, resident/stored in the computer readable medium/memory 1208, one or more hardware modules coupled to the processor 1206, or some combination thereof. The processing system 1202 may be a component of the UE 120 and may include the memory 282 and/or at least one of the TX MIMO processor 266, the RX processor 258, and/or the controller/processor 280.

In some aspects, the apparatus 1102/1102' for wireless communication includes means for attempting a random access by transmitting a random access message associated with a two-step random access procedure; means for receiving an indication that indicates that a preamble of the random access message and a payload of the random access message were successfully received, or that the payload was not successfully received; and/or means for selectively: completing the two-step random access procedure based at least in part on determining that the indication indicates that the preamble of the random access message and the payload of the random access message were successfully received, or reattempting the random access or performing a fallback to a four-step random access procedure based at least in part on determining that the indication indicates that the payload was not successfully received. The aforementioned means may be one or more of the aforementioned modules of the apparatus 1102 and/or the processing system 1202 of the apparatus 1102' configured to perform the functions recited by the aforementioned means. As described elsewhere herein, the processing system 1202 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 12 is provided as an example. Other examples may differ from what is described in connection with FIG. 12.

Figure 13:
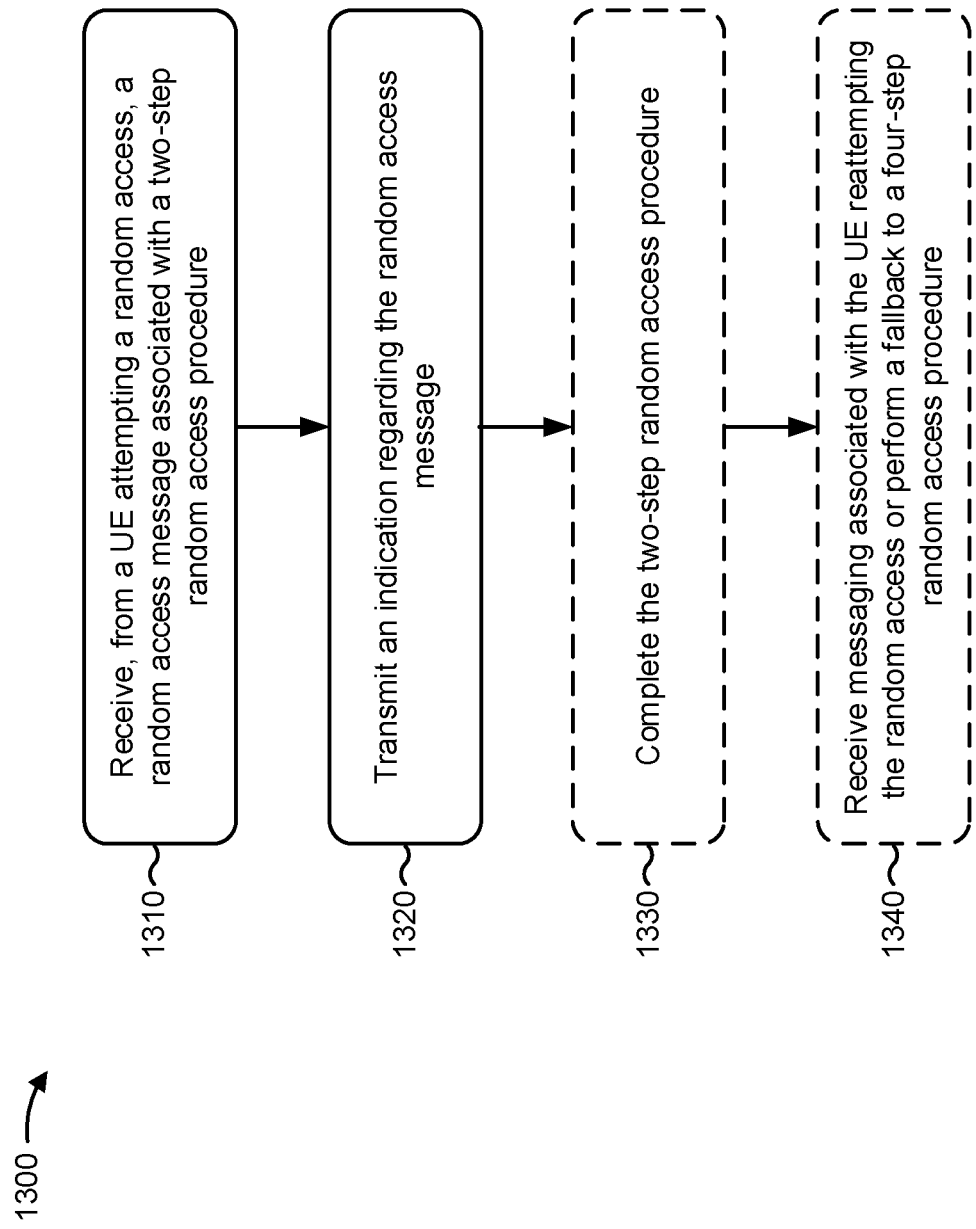
FIG. 13 is a flow chart of a method of wireless communication.

FIG. 13 is a flow chart of a method 1300 of wireless communication. The method may be performed by a base station (e.g., the BS 110 of FIG. 1, the apparatus 1402/1402', and/or the like).

At 1310, the base station (e.g., using antenna 234, DEMOD 232, MIMO detector 236, receive processor 238, controller/processor 240, and/or the like) may receive, from a user equipment (UE) attempting a random access, a random access message associated with a two-step random access procedure. For example, the random access message may include a RACH Message A. The random access message may include a preamble and a payload.

At 1320, the base station (e.g., using controller/processor 240, transmit processor 220, TX MIMO processor 230, MOD 232, antenna 234, and/or the like) may transmit an indication regarding the random access message. For example, the indication may indicate that a preamble of the random access message and a payload of the random access message were successfully received, or that the payload was not successfully received.

At 1330, the base station (e.g., using controller/processor 240, transmit processor 220, TX MIMO processor 230, MOD 232, antenna 234, and/or the like) may complete the two-step random access procedure based at least in part on determining that the indication indicates that the preamble of the random access message and the payload of the random access message were successfully received. For example, the base station may establish an RRC connection with the base station, may camp on a cell provided by the base station, and/or the like.

At 1340, the base station (e.g., using antenna 234, DEMOD 232, MIMO detector 236, receive processor 238, controller/processor 240, and/or the like) may receive messaging associated with the UE reattempting the random access or performing a fallback to a four-step random access procedure based at least in part on determining that the indication indicates that the payload was not successfully received. For example, the UE may reattempt the random access using a two-step random access procedure or a four-step random access procedure. In this case, the UE may retransmit a preamble and a payload in accordance with the two-step random access procedure or the four-step random access procedure. In some aspects, the UE may perform a fallback to the four-step random access procedure. For example, the UE may retransmit a payload of the random access message as RACH Message 3 of the four-step RACH procedure. The base station may receive the messaging described above.

In a first aspect, the indication comprises a random access response associated with the two-step random access procedure, wherein a payload of the random access response includes contention resolution information that identifies a particular UE for which the payload of the random access message was successfully received. In a second aspect, alone or in combination with the first aspect, a MAC subheader of the random access response indicates a length of the random access response. In a third aspect, alone or in combination with the first aspect and/or the second aspect, the random access response indicates that the payload was not successfully received based at least in part on the absence of contention resolution information that identifies the UE in the random access response. In a fourth aspect, alone or in combination with one or more of the first through third aspects, a MAC subheader of the random access response includes a set of bits that indicate whether a backoff indicator is included in the MAC subheader. In a fifth aspect, alone or in combination with one or more of the first through fourth aspects, the indication comprises a random access response associated with the two-step random access procedure, and contention resolution for the UE is based at least in part on a control channel that is addressed to the UE using a C-RNTI of the UE. In a fifth aspect, alone or in combination with one or more of the first through fourth aspects, a payload of the random access response does not include the C-RNTI. In a sixth aspect, alone or in combination with one or more of the first through fifth aspects, the random access response includes an uplink grant. In a seventh aspect, alone or in combination with one or more of the first through eighth aspects, the random access response does not include an uplink grant. In an eighth aspect, alone or in combination with one or more of the first through seventh aspects, the indication comprises a random access response associated with the two-step random access procedure, and the random access response identifies a C-RNTI of the UE. In a ninth aspect, alone or in combination with one or more of the first through eighth aspects, a MAC subheader of the random access response includes a set of bits that indicate that the random access response is associated with a contention resolution for a connected-mode UE. In a tenth aspect, alone or in combination with one or more of the first through ninth aspects, the random access response includes an uplink grant. In an eleventh aspect, alone or in combination with one or more of the first through tenth aspects, the random access response does not include an uplink grant. In a twelfth aspect, alone or in combination with one or more of the first through eleventh aspects, the UE is in an idle mode or an inactive mode when the random access is attempted. In a thirteenth aspect, alone or in combination with one or more of the first through twelfth aspects, the indication is associated with a MAC subheader that includes a backoff indicator and a set of bits that indicate that the MAC subheader includes the backoff indicator.

In a fourteenth aspect, alone or in combination with one or more of the first through thirteenth aspects, the indication comprises a second message of a four-step random access procedure, wherein the second message indicates that the payload was not successfully received.

In a fifteenth aspect, alone or in combination with one or more of the first through fourteenth aspects, the indication comprises an indication bit in a MAC payload of a random access response message. In a sixteenth aspect, alone or in combination with one or more of the first through fifteenth aspects, the indication bit indicates whether to perform the fallback to the four-step random access procedure. In a seventeenth aspect, alone or in combination with one or more of the first through sixteenth aspects, based at least in part on the indication bit indicating not to perform the fallback to the four-step random access procedure, the base station is configured to complete the two-step random access procedure based at least in part on contention resolution information of the random access response message identifying the UE. In an eighteenth aspect, alone or in combination with one or more of the first through seventeenth aspects, based at least in part on the indication bit indicating not to perform the fallback to the four-step random access procedure, the base station is configured to receive messaging associated with reattempting random access based at least in part on contention resolution information of the random access response message not identifying the UE.

In a nineteenth aspect, alone or in combination with one or more of the first through eighteenth aspects, a MAC subheader of the indication does not include a preamble identifier based at least in part on the preamble and the payload being successfully received. In a twentieth aspect, alone or in combination with one or more of the first through nineteenth aspects, based at least in part on the preamble and the payload for a particular UE being successfully received, the MAC subheader does not include the preamble identifier and a contention resolution MAC control element of the indication identifies the particular UE. In a twenty-first aspect, alone or in combination with one or more of the first through twentieth aspects, contention resolution MAC control elements, including the contention resolution MAC control element, and corresponding MAC subheaders, including the MAC subheader, in connection with corresponding random access responses, are provided in sequence.

In a twenty-second aspect, alone or in combination with one or more of the first through twenty-first aspects, the MAC subheader includes a first bit that indicates whether a backoff indicator or the preamble identifier is to be included in the MAC subheader and a second bit that indicates whether a field of the MAC subheader is to be used for the backoff indicator or for one or more reserved bits.

In a twenty-third aspect, alone or in combination with one or more of the first through twenty-second aspects, based at least in part on the preamble and the payload being successfully received, the indication comprises a random access response associated with the two-step random access procedure that includes contention resolution information in a payload of the random access response, wherein the indication includes a MAC subheader that does not include a preamble identifier. In a twenty-fourth aspect, alone or in combination with one or more of the first through twenty-third aspects, the MAC subheader indicates a length of the random access response and whether the MAC subheader is to include a backoff indicator.

In a twenty-fifth aspect, alone or in combination with one or more of the first through twenty-fourth aspects, the indication relates to multiple UEs including the UE. In a twenty-sixth aspect, alone or in combination with one or more of the first through twenty-fifth aspects, the UE is a first UE, and the indication indicates whether respective payloads or respective preambles of the first UE and a second UE were received. In a twenty-seventh aspect, alone or in combination with one or more of the first through twenty-sixth aspects, a media access control (MAC) sub-header of the random access response includes a set of bits that indicate that the random access response is associated with a contention resolution for an idle-mode or inactive-mode UE.

Although FIG. 13 shows example blocks of a method of wireless communication, in some aspects, the method may include additional blocks, fewer blocks, different blocks, or differently arranged blocks than those shown in FIG. 13. Additionally, or alternatively, two or more blocks shown in FIG. 13 may be performed in parallel.

Figure 14:
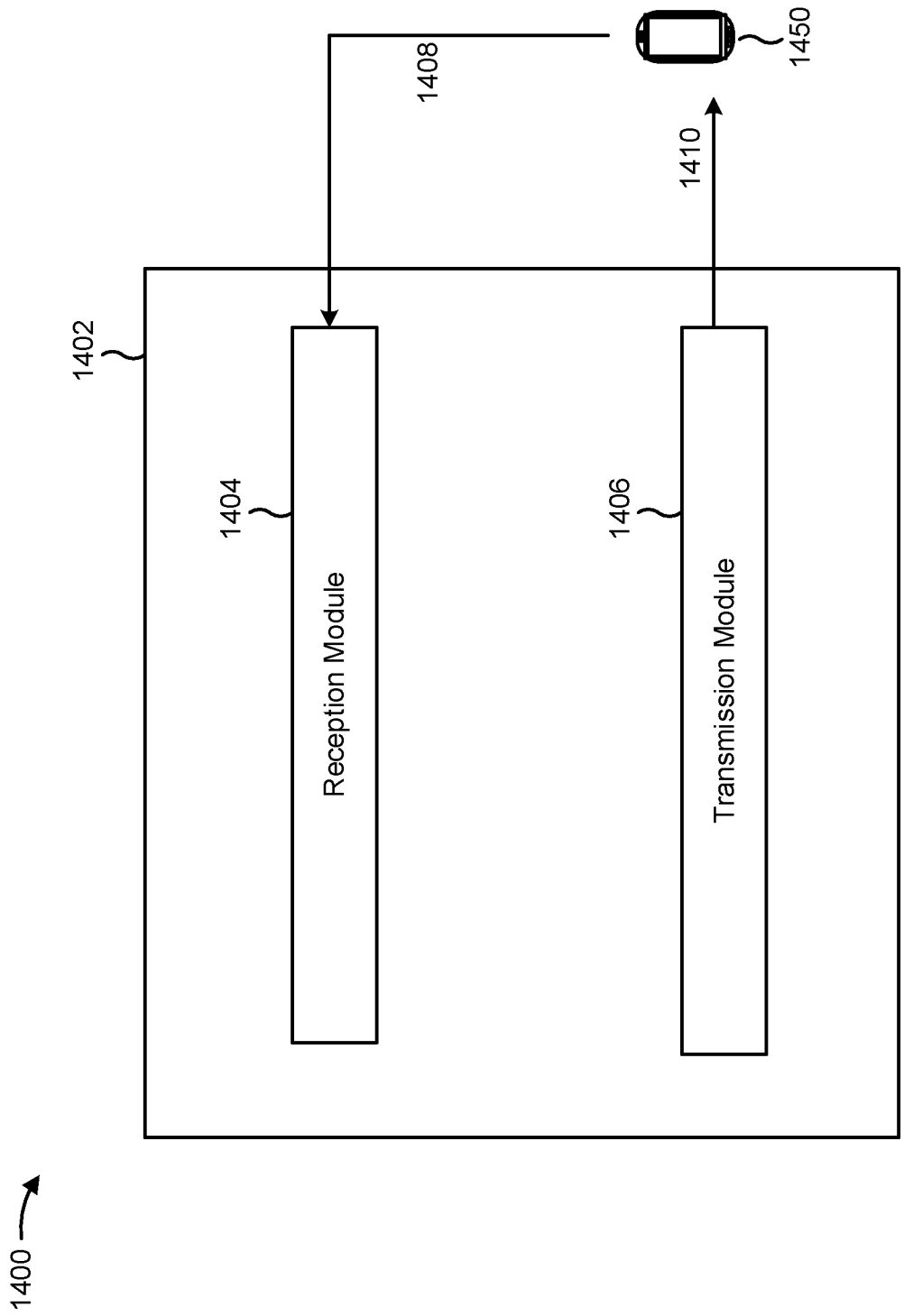
FIG. 14 is a conceptual data flow diagram illustrating the data flow between different modules/means/components in an example apparatus.

FIG. 14 is a conceptual data flow diagram 1400 illustrating data flow between different modules/means/components in an example apparatus 1402. The apparatus 1402 may be a base station. In some aspects, the apparatus 1402 includes a reception module 1404 and/or a transmission module 1406.

The reception module 1404 may receive signals 1408 from a UE 1450 (e.g., UE 120 and/or the like). The signals 1408 may include a random access message, such as a RACH Message A, a RACH Message 3, and/or the like. In some aspects, the reception module 1404 may receive a random access message associated with a two-step random access procedure, complete the two-step RACH procedure, reattempt the random access, or perform a fallback to a four-step random access procedure, as described elsewhere herein. The transmission module 1406 may transmit signals 1410 to the UE 1450. The signals 1410 may include a random access response, such as a RACH Message B or a RACH Message 2 including an indication of a result of decoding a RACH Message A, as described in more detail elsewhere herein. In some aspects, the transmission module 1406 may transmit an indication that indicates that a preamble of the random access message and a payload of the random access message were successfully received, or that the payload was not successfully received.

The apparatus may include additional modules that perform each of the blocks of the algorithm in the aforementioned method 1300 of FIG. 13 and/or the like. Each block in the aforementioned method 1300 of FIG. 13 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 14 are provided as an example. In practice, there may be additional modules, fewer modules, different modules, or differently arranged modules than those shown in FIG. 14. Furthermore, two or more modules shown in FIG. 14 may be implemented within a single module, or a single module shown in FIG. 14 may be implemented as multiple, distributed modules. Additionally, or alternatively, a set of modules (e.g., one or more modules) shown in FIG. 14 may perform one or more functions described as being performed by another set of modules shown in FIG. 14.

Figure 15:
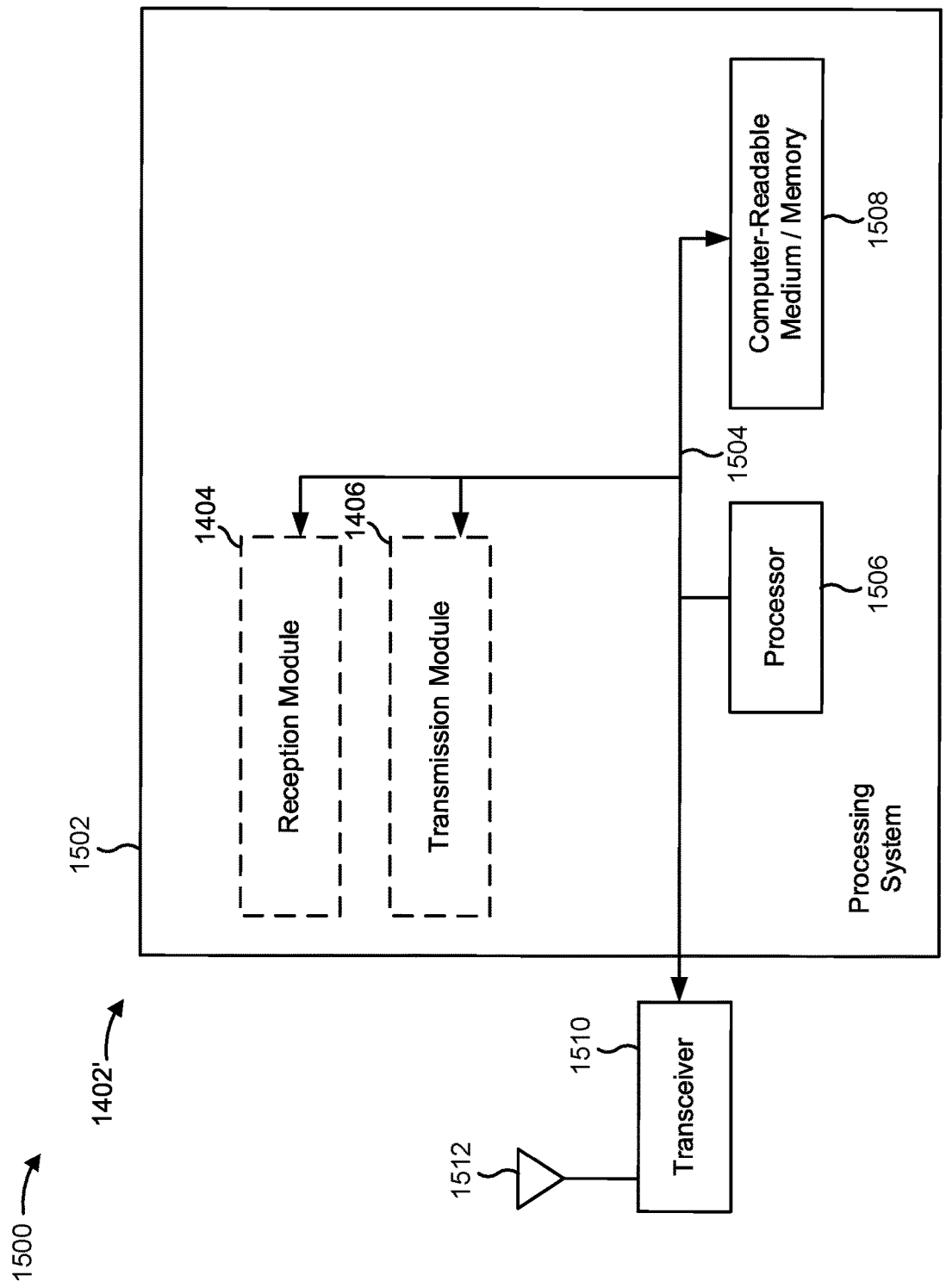
FIG. 15 is a diagram illustrating an example of a hardware implementation for an apparatus employing a processing system.

FIG. 15 is a diagram 1500 illustrating an example of a hardware implementation for an apparatus 1402' employing a processing system 1502. The apparatus 1402' may be a UE.

The processing system 1502 may be implemented with a bus architecture, represented generally by the bus 1504. The bus 1504 may include any number of interconnecting buses and bridges depending on the specific application of the processing system 1502 and the overall design constraints. The bus 1504 links together various circuits including one or more processors and/or hardware modules, represented by the processor 1506, the modules 1404, 1406, and the computer-readable medium/memory 1508. The bus 1504 may also link various other circuits such as timing sources, peripherals, voltage regulators, and power management circuits, which are well known in the art, and therefore will not be described any further.

The processing system 1502 may be coupled to a transceiver 1510. The transceiver 1510 is coupled to one or more antennas 1512. The transceiver 1510 provides a means for communicating with various other apparatuses over a transmission medium. The transceiver 1510 receives a signal from the one or more antennas 1512, extracts information from the received signal, and provides the extracted information to the processing system 1502, specifically the reception module 1404. In addition, the transceiver 1510 receives information from the processing system 1502, specifically the transmission module 1406, and based at least in part on the received information, generates a signal to be applied to the one or more antennas 1512. The processing system 1502 includes a processor 1506 coupled to a computer-readable medium/memory 1508. The processor 1506 is responsible for general processing, including the execution of software stored on the computer-readable medium/memory 1508. The software, when executed by the processor 1506, causes the processing system 1502 to perform the various functions described herein for any particular apparatus. The computer-readable medium/memory 1508 may also be used for storing data that is manipulated by the processor 1506 when executing software. The processing system further includes at least one of the modules 1404 and 1406. The modules may be software modules running in the processor 1506, resident/stored in the computer readable medium/memory 1508, one or more hardware modules coupled to the processor 1506, or some combination thereof. The processing system 1502 may be a component of the eNB 110 and may include the memory 242 and/or at least one of the TX MIMO processor 230, the RX processor 238, and/or the controller/processor 240.

In some aspects, the apparatus 1402/1402' for wireless communication includes means for receiving, from a user equipment (UE) attempting a random access, a random access message associated with a two-step random access procedure; means for transmitting an indication that indicates that a preamble of the random access message and a payload of the random access message were successfully received, or that the payload was not successfully received; and means for selectively: completing the two-step random access procedure based at least in part on determining that the indication indicates that the preamble of the random access message and the payload of the random access message were successfully received, or receiving messaging associated with the UE reattempting the random access or performing a fallback to a four-step random access procedure based at least in part on determining that the indication indicates that the payload was not successfully received. The aforementioned means may be one or more of the aforementioned modules of the apparatus 1402 and/or the processing system 1502 of the apparatus 1402' configured to perform the functions recited by the aforementioned means. As described elsewhere herein, the processing system 1502 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 15 is provided as an example. Other examples may differ from what is described in connection with FIG. 15.

Figure 16:
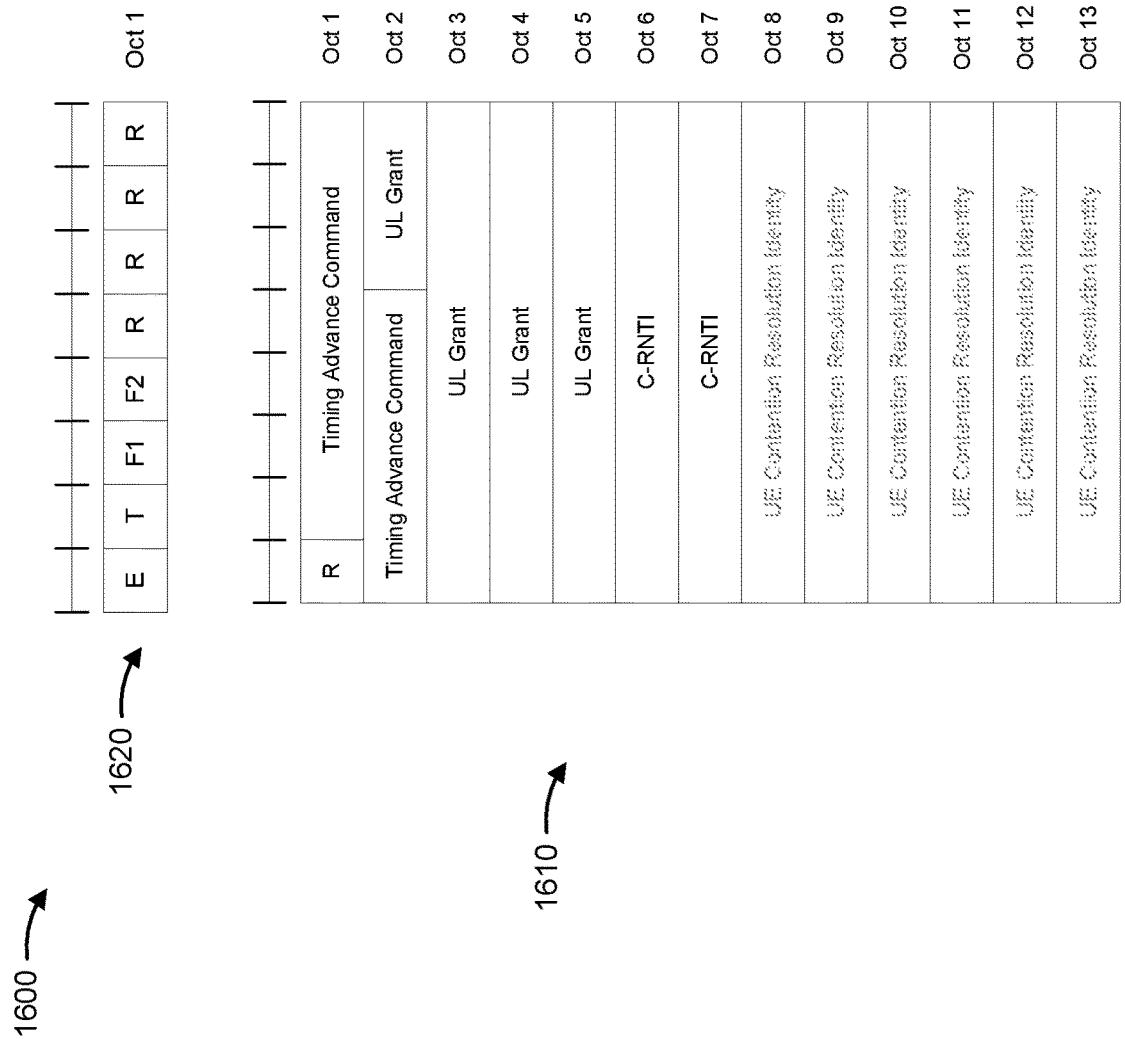
FIG. 16 is a diagram illustrating an example of a media access control messaging structure for an idle-mode or inactive-mode UE associated with a successful random access message.

FIG. 16 is a diagram illustrating an example 1600 of a media access control messaging structure for an idle-mode or inactive-mode UE associated with a successful random access message. In other words, the MAC messaging structure shown in example 1600 may be used for a UE 120 that is in an idle mode or an inactive mode, and for which a payload and preamble of the UE 120's random access message are successfully received. A payload of an indicator (e.g., a random access response) of the MAC messaging structure is shown by reference number 1610. For example, the payload may be part of a random access response, and may identify contention resolution information for the UE 120. In this case, the uplink grant and the C-RNTI may be used for a subsequent data. As shown by reference number 1620, the indicator may be associated with a MAC subheader. For example, the MAC subheader may include a set of bits (shown as F1 and F2). A value of the set of bits may indicate information regarding the MAC subheader and/or the payload. As one example, in example 1600, the value of the set of bits may indicate that no BI field is present in the MAC subheader, and may indicate that contention resolution information is present in the random access response. In this case, the Message B random access response may include a timing advance command, an uplink grant, a C-RNTI of a successful random access message, and contention resolution information.

FIG. 16 is provided as an example. Other examples may differ from what is described in connection with FIG. 16.

Figure 17A:
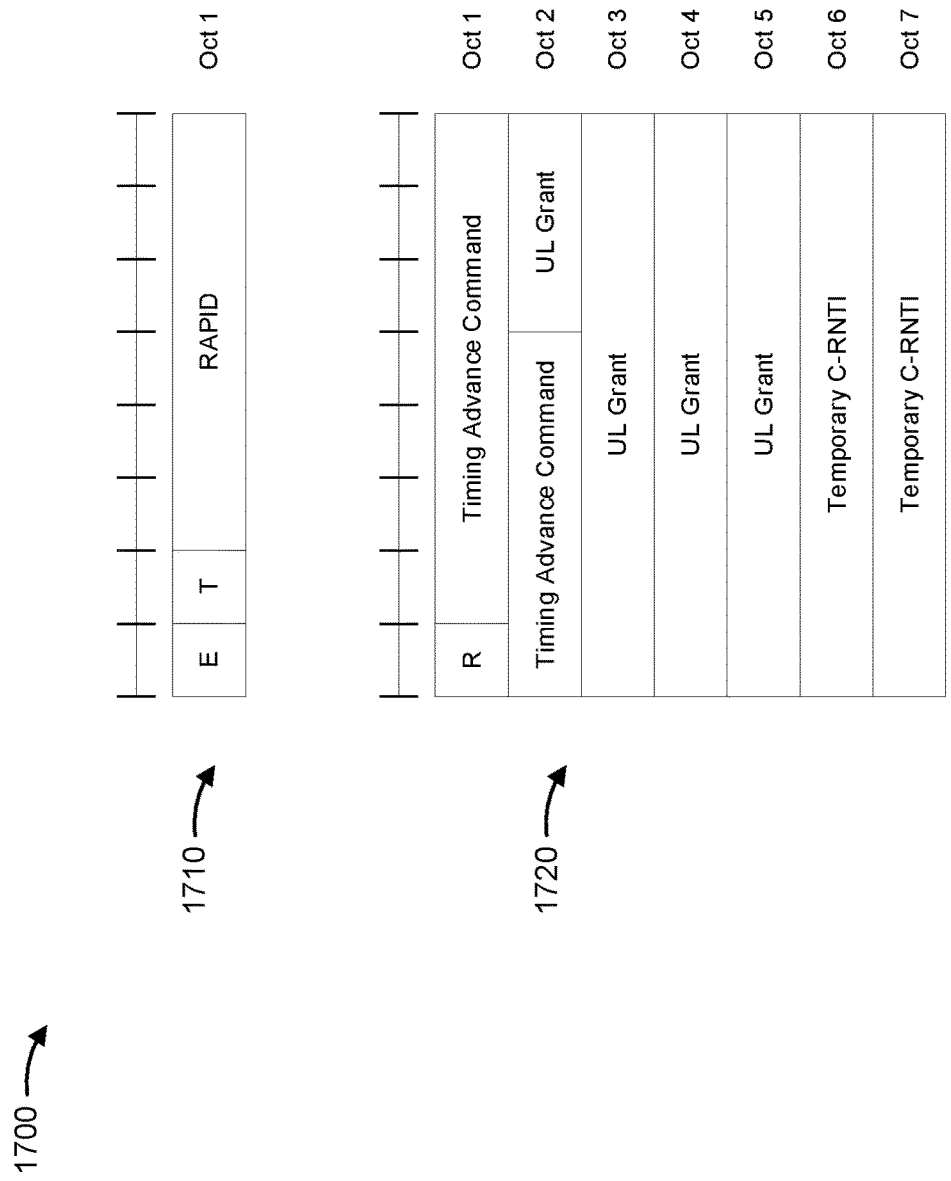
FIGS. 17A and 17B are diagrams illustrating examples of a media access control messaging structure for UE associated with a random access message for which the payload was unsuccessfully received, and an example of a media access control subheader for a UE from which no part of the random access message was successfully received.
Figure 17B:
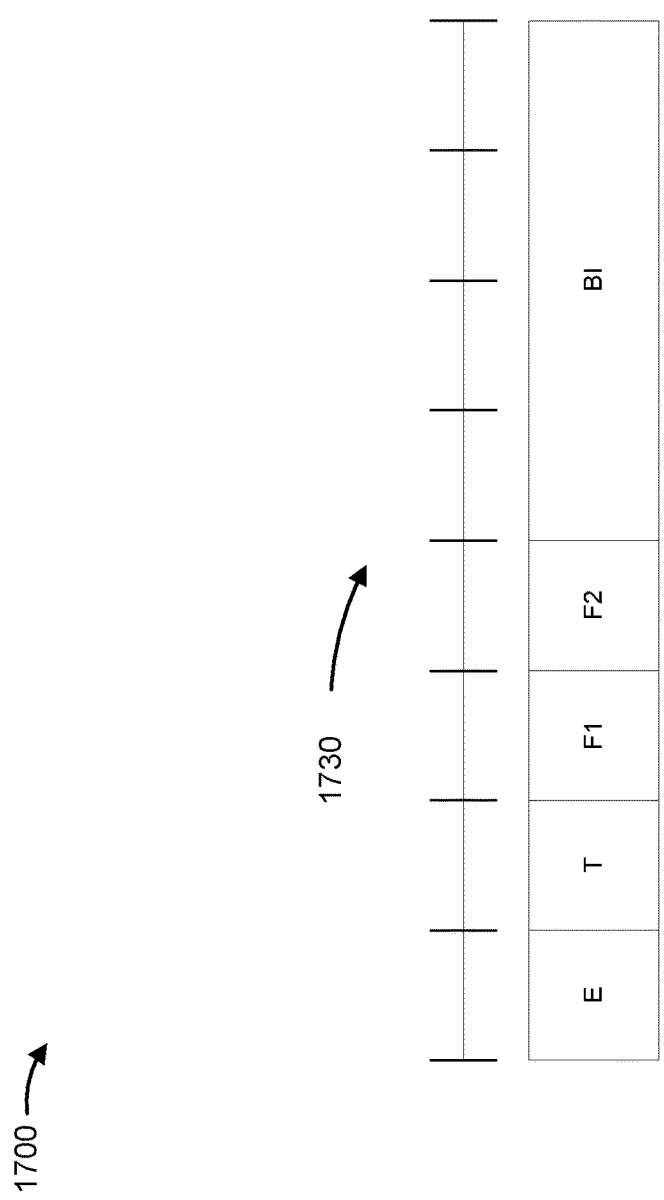

FIGS. 17A and 17B are diagrams illustrating examples 1700 of a media access control messaging structure for a UE associated with a random access message for which the payload was unsuccessfully received and the preamble was successfully received, and an example of a media access control subheader for a UE for which no part of the random access message was successfully received. Examples 1700 include a MAC subheader 1710 and a MAC payload 1720 (shown in FIG. 17A), and/or a MAC subheader 1730 (shown in FIG. 17B). For example, MAC subheader 1710 and MAC payload 1720 may comprise a RACH Message 2 of the four-step RACH process. A UE that receives MAC subheader 1710 and MAC payload 1720 may determine that a payload of a random access message transmitted by the UE was unsuccessfully received.

As shown, MAC subheader 1730 may include a set of bits (e.g., F1 and F2). In this case, a value of the set of bits may indicate that MAC subheader 1730 includes a BI field. The BI field may be used by UEs for which neither the preamble nor the payload was successfully received. For example, the UE may determine that the RACH process was unsuccessful based at least in part on determining that the UE's contention resolution information and preamble identifier are not identified by a set of random access responses, and may accordingly read MAC subheaders with BI information only to determine a BI value for a subsequent random access message by the UE.

Example 1700 is applicable for connected-mode UEs, idle-mode UEs, and inactive-mode UEs.

FIGS. 17A and 17B are provided as examples. Other examples may differ from what is described in connection with FIGS. 17A and 17B.

Figure 18:
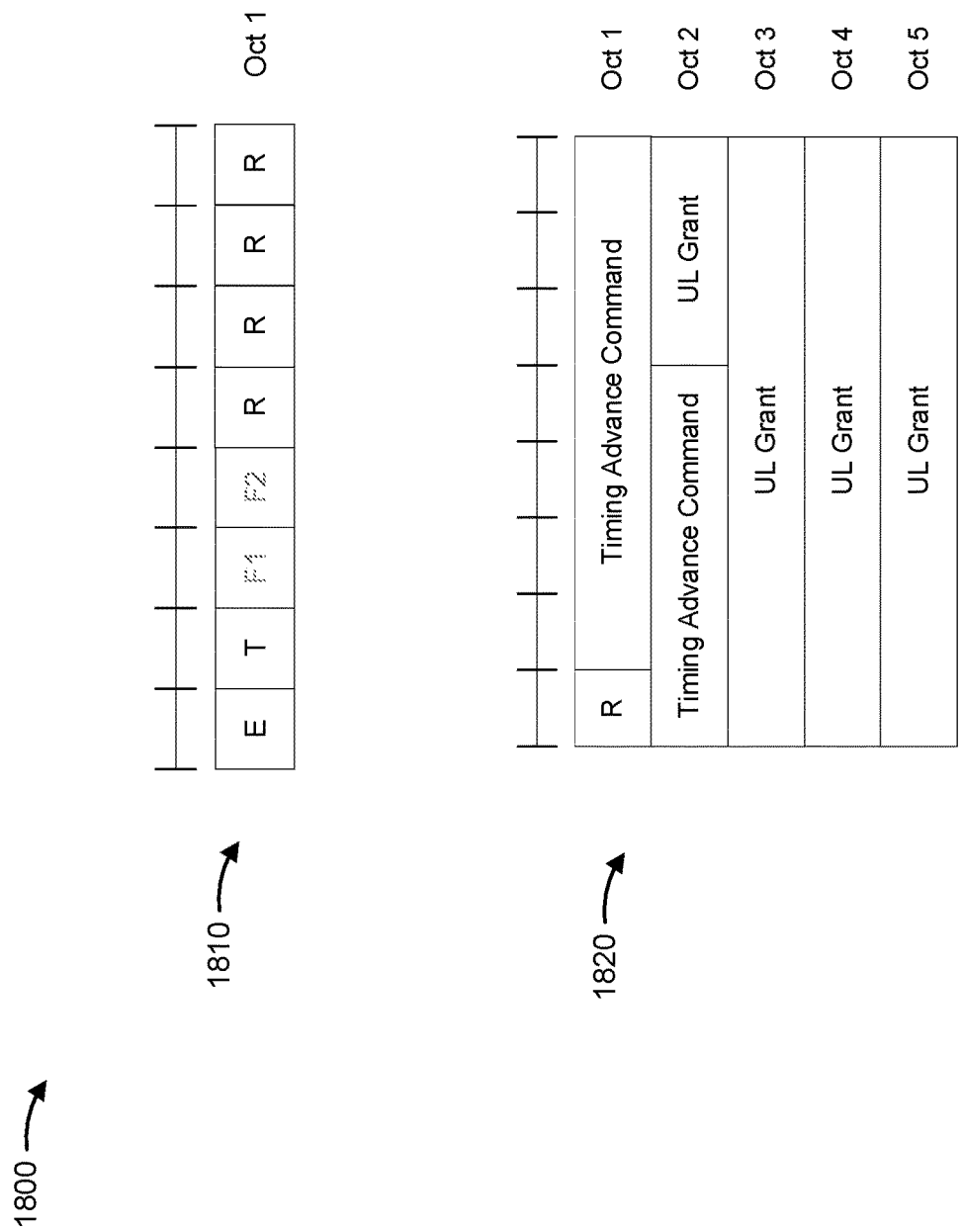
FIG. 18 is a diagram illustrating an example of a media access control messaging structure for a connected-mode UE associated with a random access message for which the payload was successfully received.

FIG. 18 is a diagram illustrating an example 1800 of a media access control messaging structure for a connected-mode UE associated with a random access message for which the payload was successfully received. As shown, example 1800 includes a MAC subheader 1810 and a MAC payload 1820. In this case, contention resolution may be performed using a physical downlink control channel (PDCCH) addressed using a C-RNTI identified by a random access message transmitted by the UE. For example, in some cases (referred to herein as Option 1), if RACH Message A includes the C-RNTI MAC-CE, contention resolution may be performed using a PDCCH addressed to the C-RNTI of the successfully-received RACH Message A, and Message B may be directed to the UE associated with the C-RNTI. Otherwise, RACH Message B may be addressed to the RA-RNTI and may contain information for multiple UEs. The contention resolution may be based on the contention resolution ID included in RACH Message B, which may match the UE ID identified in RACH Message A.

In other cases (referred to herein as Option 2), RACH Message B may contain information for multiple UEs, and may be addressed to the RA-RNTI. In this case, the C-RNTI may be included in the random access response as contention resolution information for an RRC_CONNECTED UE. Example 1800 pertains to Option 1.

As shown, MAC subheader 1810 may include a set of bits (e.g., F1 and F2). In this case, the set of bits may be set to a value that indicates that the random access response is for a connected-mode UE. In some aspects, the set of bits may indicate that the random access response is to include contention resolution information, as described in more detail below in connection with FIG. 19. In some aspects, the set of bits may indicate whether the random access response is to include a BI field or other reserved bits. In some aspects, the set of bits may indicate whether the random access response is for a connected-mode UE, or an idle-mode or inactive-mode UE.

As shown, MAC payload 1820 includes an uplink grant. The uplink grant may be optional, as described elsewhere herein. As further shown, MAC payload 1820 may not include contention resolution information. For example, when Option 1 is used, MAC payload 1820 may not need to include contention resolution information. In this case, the uplink grant may be used for a subsequent data transmission. Furthermore, MAC subheader 1810 may not identify a preamble identifier, since contention resolution is handled using the PDCCH addressed to the C-RNTI.

FIG. 18 is provided as an example. Other examples may differ from what is described in connection with FIG. 18.

Figure 19:
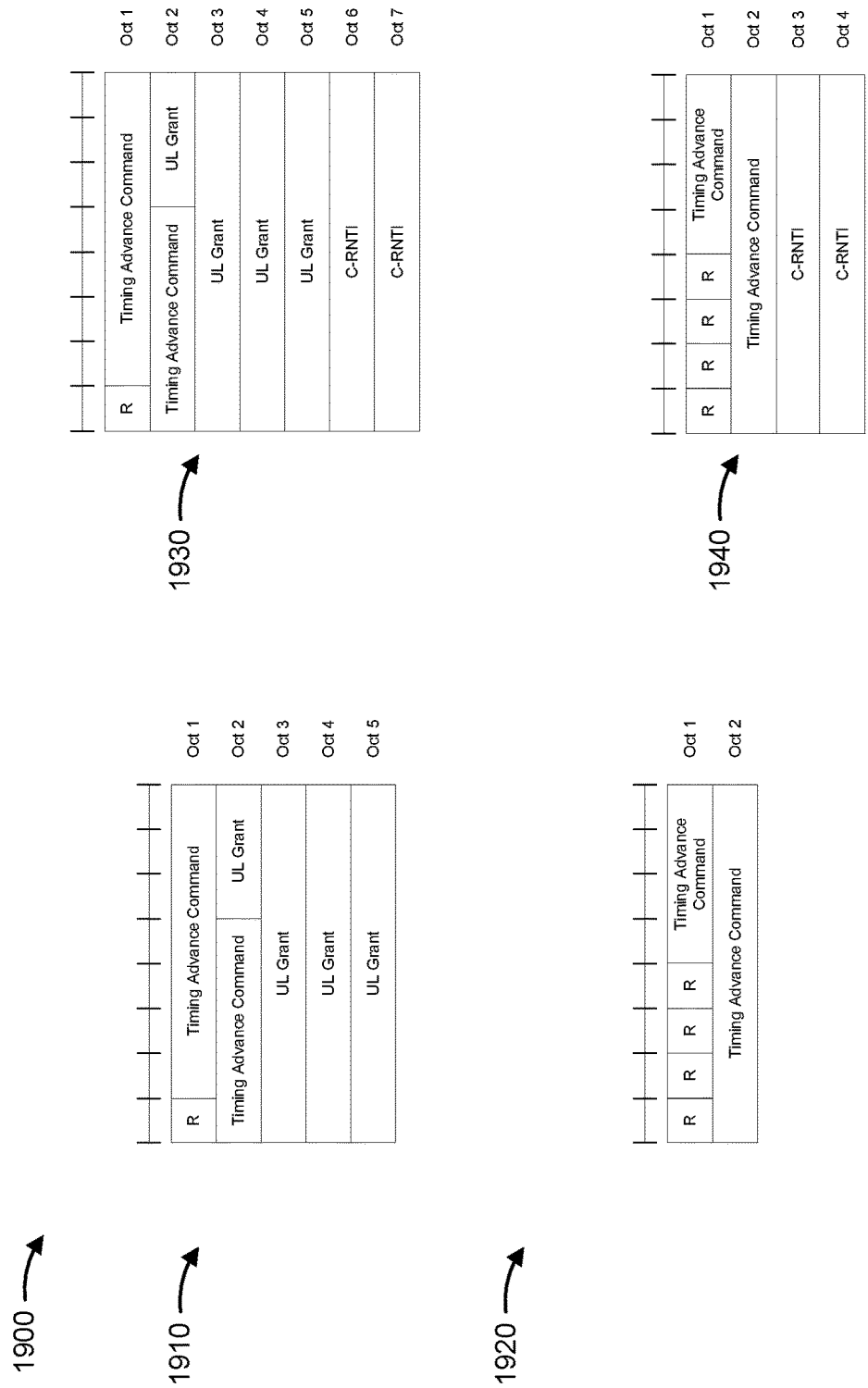
FIG. 19 is a diagram illustrating examples of media access control message payloads for a connected-mode UE associated with a successful random access message.

FIG. 19 is a diagram illustrating examples 1900 of media access control message payloads for a connected-mode UE associated with a successful random access message. Example 1910 illustrates a first example wherein the MAC payload includes an uplink grant and no contention resolution information. Example 1920 illustrates a second example wherein the MAC payload includes no uplink grant and no contention resolution information. Example 1930 illustrates a third example wherein the MAC payload includes an uplink grant and contention resolution information. Example 1940 illustrates a fourth example wherein the MAC payload includes contention resolution information and no uplink grant. In examples 1930 and 1940, contention resolution information is included in the random access response in the form of a C-RNTI, since UEs may use the RA-RNTI to receive the random access response sent from the BS 110.

FIG. 19 is provided as an example. Other examples may differ from what is described in connection with FIG. 19.

Figure 20:
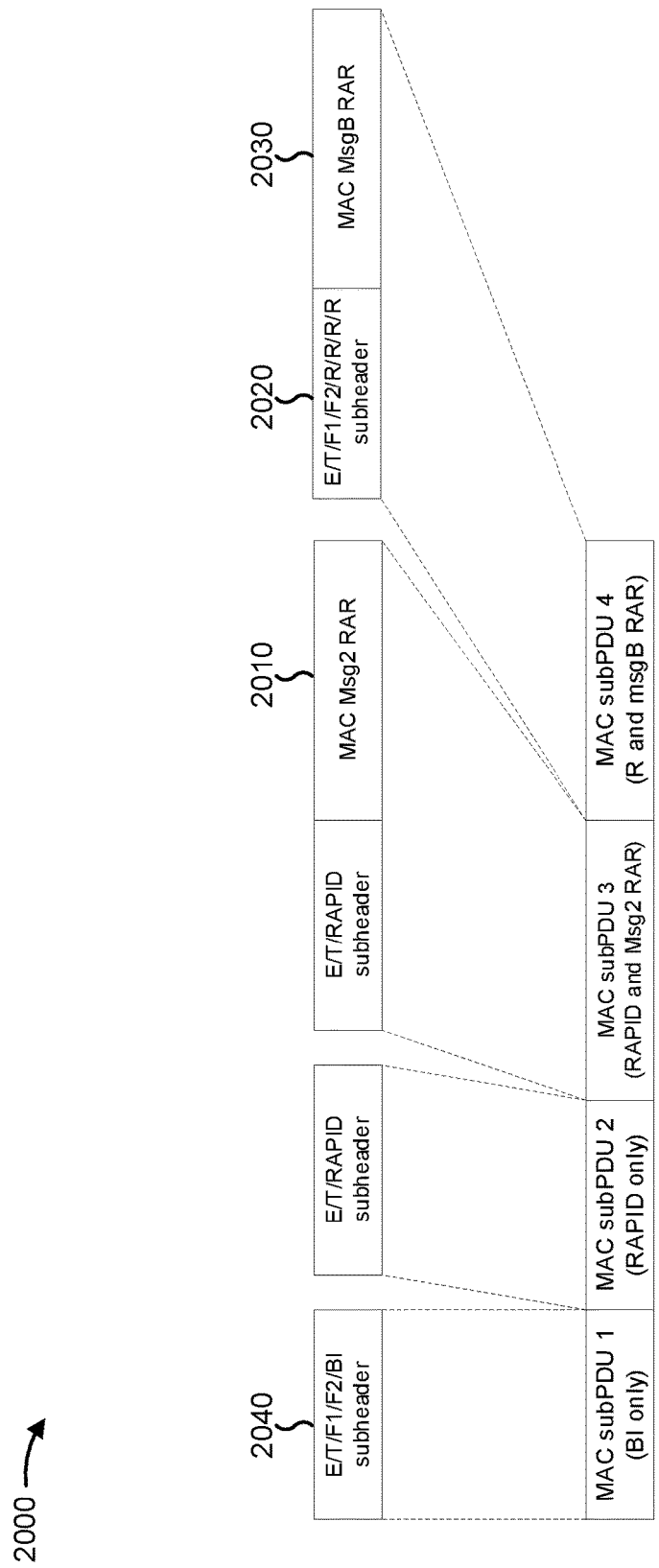
FIG. 20 is a diagram illustrating an example of a media access control messaging structure for multiple UEs.

FIG. 20 is a diagram illustrating an example 2000 of a media access control messaging structure for multiple UEs. Random access responses for multiple UEs may be multiplexed as illustrated in example 2000. For example, and as shown by reference number 2010, a first MAC payload, using a RACH Message 2 format, may indicate that one or more corresponding UEs' random access payloads were not successfully received. As shown by reference number 2020, a MAC subheader may include a set of bits (e.g., F1 and F2) that indicate whether the MAC subheader is for an idle-mode UE or a connected-mode UE. The corresponding MAC payload, shown by reference number 2030, may include a RACH Message B that identifies one or more UEs for a corresponding random access message that was successfully received. Furthermore, as shown by reference number 2040, a MAC subheader of MAC subPDU1 may include a set of bits (e.g., F1 and F2) that indicate whether the MAC subheader includes a backoff indicator. This MAC subheader may be used to provide backoff information for UEs for which the preamble and the payload were not successfully received.

FIG. 20 is provided as an example. Other examples may differ from what is described in connection with FIG. 20.

It should be understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
    attempting a random access by transmitting a random access message associated with a two-step random access procedure, wherein:
        the random access message comprises a preamble and a payload in a single uplink message, and
        the payload comprises contention resolution information included in a common control channel service data unit;
    receiving a random access response that includes:
        a medium access control (MAC) subheader that includes a set of reserved bits, and
        a MAC control element (MAC CE) that includes a contention resolution identity associated with the contention resolution information of the payload of the random access message,
        wherein the contention resolution identity, in conjunction with the set of reserved bits, indicates that the preamble of the random access message and the payload of the random access message were successfully received; and
    completing the two-step random access procedure based at least in part on the contention resolution identity and the set of reserved bits indicating that the preamble of the random access message and the payload of the random access message were successfully received.

2. The method of claim 1, wherein the random access response is associated with the two-step random access procedure, and wherein the contention resolution identity identifies a particular UE from which the payload of the random access message was successfully received.

3. The method of claim 2, wherein the MAC subheader of the random access response includes a set of bits that indicate whether a backoff indicator is included in the MAC subheader.

4. The method of claim 1, wherein the random access response is associated with the two-step random access procedure, and wherein the random access response is addressed to a cell radio network temporary identifier (C-RNTI) of the UE.

5. The method of claim 4, wherein a payload of the random access response does not include the C-RNTI.

6. The method of claim 4, wherein the random access response does not include an uplink grant.

7. The method of claim 1, wherein the random access response is associated with the two-step random access procedure, and wherein the random access response identifies a cell radio network temporary identifier (C-RNTI) of the UE.

8. The method of claim 7, wherein the random access response does not include an uplink grant.

9. The method of claim 7, wherein the MAC subheader of the random access response includes a set of bits that indicate that the random access response is associated with a contention resolution for an idle-mode UE or an inactive-mode UE.

10. The method of claim 1, wherein the UE is in an idle mode or an inactive mode when the random access is attempted.

11. The method of claim 1, wherein the UE is in a connected mode when the random access is attempted.

12. The method of claim 1, wherein the MAC subheader of the random access response does not include a preamble identifier based at least in part on the preamble and the payload being successfully received.

13. The method of claim 12, wherein the MAC CE of the random access response identifies a particular UE for which the payload and the preamble were successfully received.

14. The method of claim 12, wherein the MAC subheader includes a first bit that indicates whether a backoff indicator or the preamble identifier is included in the MAC subheader and a second bit that indicates whether a field of the MAC subheader is used for the backoff indicator or for the set of reserved bits.

15. The method of claim 1, wherein the random access response identifies an uplink grant.

16. A method of wireless communication performed by a base station, comprising:
receiving, from a user equipment (UE) attempting a random access, a random access message associated with a two-step random access procedure, wherein:
the random access message comprises a preamble and a payload in a single uplink message, and
the payload comprises contention resolution information included in a common control channel service data unit;
transmitting a random access response that includes:
a medium access control (MAC) subheader that includes a set of reserved bits, and
a MAC control element (MAC CE) that includes a contention resolution identity associated with the contention resolution information of the payload of the random access message,
wherein the contention resolution identity, in conjunction with the set of reserved bits, indicates that the preamble of the random access message and the payload of the random access message were successfully received; and
completing the two-step random access procedure based at least in part on the contention resolution identity and the set of reserved bits indicating that the preamble of the random access message and the payload of the random access message were successfully received.

17. The method of claim 16, wherein the random access response is associated with the two-step random access procedure, wherein the contention resolution identity identifies a particular UE for which the payload of the random access message was successfully received.

18. The method of claim 17, wherein the MAC subheader of the random access response includes a set of bits that indicate whether a backoff indicator is included in the MAC subheader.

19. The method of claim 16, wherein the random access response is associated with the two-step random access procedure, and wherein the random access response is addressed to a cell radio network temporary identifier (C-RNTI) of the UE.

20. The method of claim 19, wherein the MAC subheader of the random access response includes a set of bits that indicate that the random access response is associated with a contention resolution for an idle-mode UE or an inactive-mode UE.

21. The method of claim 16, wherein the random access response identifies an uplink grant.

22. A user equipment (UE) for wireless communication, comprising:
one or more memories; and
one or more processors, coupled to the one or more memories, which are configured, individually or in any combination, to:
attempt a random access by transmitting a random access message associated with a two-step random access procedure, wherein:
the random access message comprises a preamble and a payload in a single uplink message, and
the payload comprises contention resolution information included in a common control channel service data unit;
receive a random access response that includes:
a medium access control (MAC) subheader that includes a set of reserved bits, and
a MAC control element (MAC CE) that includes a contention resolution identity associated with the contention resolution information of the payload of the random access message,
wherein the contention resolution identity, in conjunction with the set of reserved bits, indicates that the preamble of the random access message and the payload of the random access message were successfully received; and
complete the two-step random access procedure based at least in part on the contention resolution identity and the set of reserved bits indicating that the preamble of the random access message and the payload of the random access message were successfully received.

23. The UE of claim 22, wherein the random access response is associated with the two-step random access procedure, and wherein the contention resolution identity identifies a particular UE from which the payload of the random access message was successfully received.

24. The UE of claim 22, wherein the random access response is associated with the two-step random access procedure, and wherein the random access response is addressed to a cell radio network temporary identifier (C-RNTI) of the UE.

25. The UE of claim 22, wherein the random access response is associated with the two-step random access procedure, and wherein the random access response identifies a cell radio network temporary identifier (C-RNTI) of the UE.

26. The UE of claim 22, wherein the MAC subheader of the indication does not include a preamble identifier based at least in part on the preamble and the payload being successfully received.

27. The UE of claim 22, wherein the random access response identifies an uplink grant.

28. A base station for wireless communication, comprising:
one or more memories; and
one or more processors, coupled to the one or more memories, which are configured, individually or in any combination, to:
receive, from a user equipment (UE) attempting a random access, a random access message associated with a two-step random access procedure, wherein:
the random access message comprises a preamble and a payload in a single uplink message, and
the payload comprises contention resolution information included in a common control channel service data unit;
transmit a random access response that includes:
a medium access control (MAC) subheader that includes a set of reserved bits, and a MAC control element (MAC CE) that includes a contention resolution identity associated with the contention resolution information of the payload of the random access message, wherein the contention resolution identity, in conjunction with the set of reserved bits, indicates that the preamble of the random access message and the payload of the random access message were successfully received; and complete the two-step random access procedure based at least in part on the contention resolution identity and the set of reserved bits indicating that the preamble of the random access message and the payload of the random access message were successfully received.

29. The base station of claim 28, wherein the random access response is associated with the two-step random access procedure, wherein the contention resolution identity identifies a particular UE for which the payload of the random access message was successfully received.

30. The base station of claim 28, wherein the random access response identifies an uplink grant.

* * * * *